(12) United States Patent
Miyamoto

(10) Patent No.: US 9,940,053 B2
(45) Date of Patent: Apr. 10, 2018

(54) INFORMATION PROCESSING DEVICE, INFORMATION PROCESSING SYSTEM, MEMORY MANAGEMENT METHOD, AND PROGRAM RECORDING MEDIUM

(71) Applicant: NEC Corporation, Minato-ku, Tokyo (JP)

(72) Inventor: Takamichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/311,661

(22) PCT Filed: May 26, 2015

(86) PCT No.: PCT/JP2015/002649
§ 371 (c)(1),
(2) Date: Nov. 16, 2016

(87) PCT Pub. No.: WO2015/182122
PCT Pub. Date: Dec. 3, 2015

(65) Prior Publication Data
US 2017/0083258 A1    Mar. 23, 2017

(30) Foreign Application Priority Data

May 28, 2014   (JP) .................................. 2014-109684

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/0673* (2013.01); *G06F 12/02* (2013.01)

(58) Field of Classification Search
None
See application file for complete search history.

(56) References Cited

U.S. PATENT DOCUMENTS 7,949,903 B2    5/2011  Calinoiu et al.
8,677,373 B2    3/2014  Shi
(Continued)

FOREIGN PATENT DOCUMENTS

JP    H05-210524 A    8/1993
JP    H08-272621 A    10/1996
(Continued)

OTHER PUBLICATIONS

International Search Report for PCT Application No. PCT/JP2015/002649, dated Aug. 11, 2015.
(Continued)

*Primary Examiner* — Kevin Verbrugge

(57) ABSTRACT

The present invention discloses an information-processing device with which it is possible to improve throughput by avoiding application stoppage due to the shortage of a memory area, and by reducing the application processing time needed for reserving and freeing memory. This information-processing device is provided with: a memory-processing control unit configured to, when a memory-reserving request for a memory is received, determine whether an area size requested by the memory-reserving request can be reserved in a free area of the memory, and when a memory-freeing request for the memory is received, determines whether there is the memory-reserving request that is left pending; a reserving request processing unit configured to leave the memory-reserving request pending when it is determined by the memory-processing control unit that the area size cannot be reserved; and a freeing request processing unit which destroys or leaves pending the memory-freeing request when it is determined by the memory-processing control unit that there is no memory-reserving request that is left pending.

10 Claims, 19 Drawing Sheets

(56) References Cited

U.S. PATENT DOCUMENTS

2010/0083047 A1    4/2010    Calinoiu et al.
2011/0239223 A1    9/2011    Shi

FOREIGN PATENT DOCUMENTS

| JP | 2011-175395 A | 9/2011 |
| JP | 2012-503825 A | 2/2012 |
| JP | 2012-089103 A | 5/2012 |
| JP | 2012-146152 A | 8/2012 |

OTHER PUBLICATIONS

English translation of Written opinion for PCT Application No. PCT/JP2015/002649, dated Aug. 11, 2015.

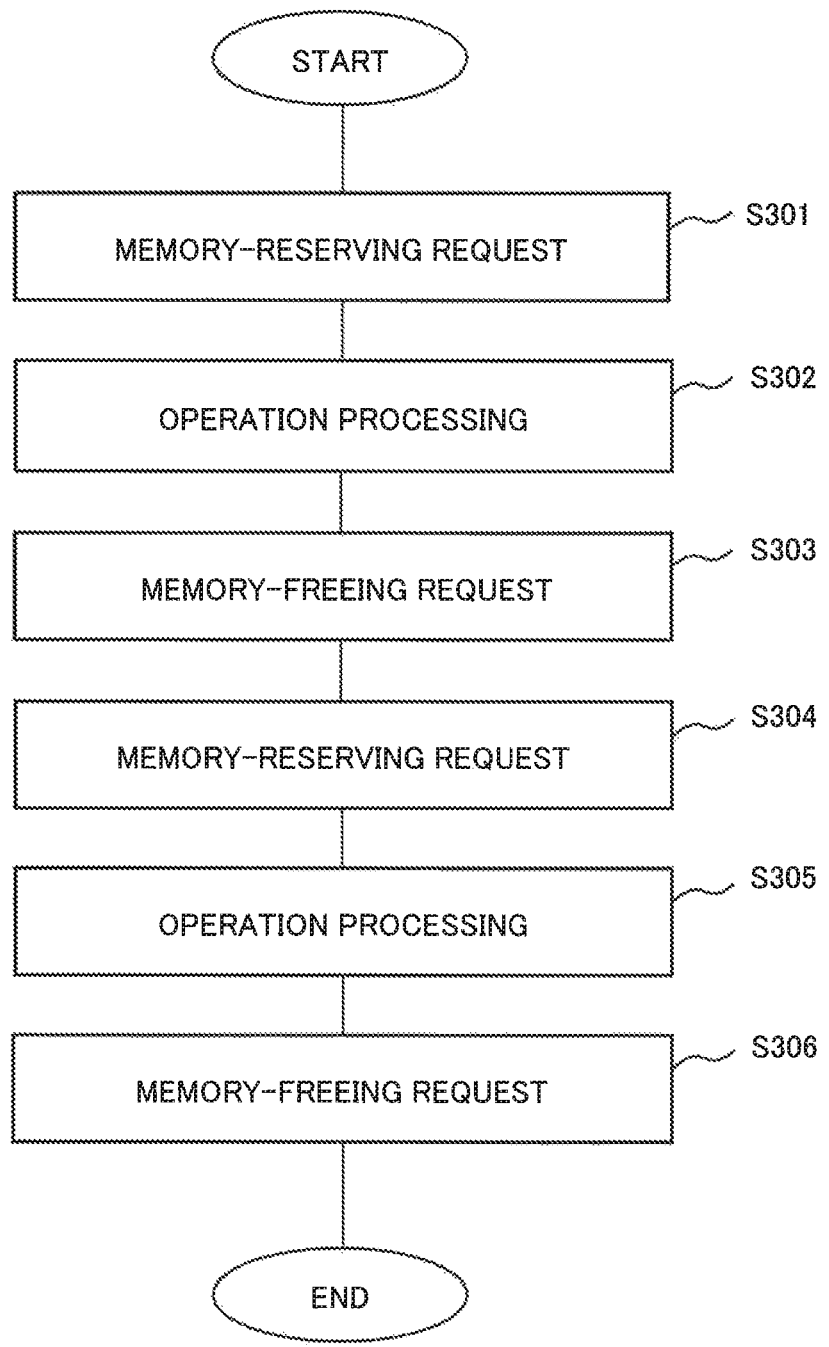

US 9,940,053 B2

INFORMATION PROCESSING DEVICE, INFORMATION PROCESSING SYSTEM, MEMORY MANAGEMENT METHOD, AND PROGRAM RECORDING MEDIUM

This application is a National Stage Entry of PCT/JP2015/002649 filed on May 26, 2015, which claims priority from Japanese Patent Application 2014-109684 filed on May 28, 2014, the contents of all of which are incorporated herein by reference, in their entirety.

TECHNICAL FIELD

The present invention relates to a technique for management of reserving and freeing memory that is used for executing an application program.

BACKGROUND ART

An operating system (hereinafter, referred to as an "OS") has a function of reserving and freeing a memory area of a requested size in response to a memory-reserving request and a memory-freeing request that are transmitted from various application programs.

For example, PTL 1 discloses an information-processing device that prevents the performance degradation of an application program (hereinafter, simply referred to as an "application") by quickly responding to a memory-reserving request and a memory-freeing request that are issued from the application. This information-processing device reserves a memory area of a size that is necessary for the entire application upon activation of the application and assigns a portion of the area reserved upon activation to the application in response to a memory-reserving request that is issued during execution of the application. As such, this information processing device reduces execution time of memory reserving processing and memory freeing processing by reducing transmission of memory-reserving requests and memory-freeing requests from the application to a virtual memory.

Further, PTL 2 discloses a shared resource management system that makes resource management efficient and reduces resource returning processing costs. This shared resource management system manages resources in units of groups of a plurality of processes and provisionally returns resources which have been used. Then, if another group issues an allocation request, this shared resource management system actually returns the provisionally returned resources and assigns the returned resources to the other group. If no other group issues allocation requests, the shared resource management system performs return processing when all the processes included in the group have completed. In this way, for efficiency of resource management, the shared resource management system reduces the processing costs for returning resources by provisional returning, in which resources are returned both by each process and in a collective manner.

PTL 3 discloses processing relating to reserving and freeing a memory area.

To address increase of loads upon execution of applications, servers that are mounted with a high-performance many-core accelerator in addition to a host processor, have been increasingly used recently. The many-core accelerator includes a plurality of cores that perform operation processing, as well as, limited memory areas used by the cores.

When a server that is mounted with such a many-core accelerator uses the many-core accelerator, the following processing is performed: that is, processing of reserving memory equipped in the many-core accelerator, processing of transferring data from a memory used by a host processor to the memory equipped in the many-core accelerator, and operation processing in the many-core accelerator are performed. Further, processing of transferring data from the memory equipped in the many-core accelerator to the memory used by the host processor and processing of freeing the memory equipped in the many-core accelerator are also performed.

As such, a method as described above where a server uses a many-core accelerator is called as an "offload method." Further, the function of an application for performing these series of processing is called as an "offload unit." As described above, memory reserving processing and memory freeing processing are performed by an OS in response to a memory-reserving request and a memory-freeing request from an application.

The data transfer processing between the memory used by the host processor and the memory equipped in the many-core accelerator is performed using Direct Memory Access (DMA).

CITATION LIST

Patent Literature

PTL 1: Japanese Patent Application Laid-open Publication No. 2011-175395
PTL 2: Japanese Patent Application Laid-open Publication No. 2012-146152
PTL 3: Japanese Patent Application Laid-open Publication No. 1996-272621

SUMMARY OF INVENTION

Technical Problem

As described above, the data transfer processing between the memory used by the host processor and the memory equipped in the many-core accelerator is performed using DMA. During this transfer processing, the memory area equipped in the many-core accelerator is reserved by a method called as a "pinning" method. The memory area reserved by this pinning cannot be swapped out (which is to make an available memory area by transferring the data to an auxiliary storage device or the like). As such, the many-core accelerator has a risk of the shortage of a memory area that can be reserved during execution of the operation processing. In such a case, the shortage of a memory area may cause an error of an application, which might stop the application.

Further, the many-core accelerator generally has lower operating frequency than the host processor. As such, time that is taken by the many-core accelerator for memory reserving processing and memory freeing processing is relatively longer than time that is taken by the host processor for memory reserving processing and memory freeing processing. Thus, the many-core accelerator might degrade the throughput of the server.

In the above-described PTL 1, a memory management mechanism reserves a memory area of a predetermined capacity and uses or frees the unused area of the reserved memory area in accordance with a request from the application. However, in such a case, if a plurality of applications are simultaneously executed, an error might possibly occur due to the shortage of a memory area.

Further, while the above-described PTL 2 minimizes passing of shared resources among a plurality of process groups, processing time cannot be reduced as allocation of shared resources to the same process group requires allocation processing once again.

The above-described PTL 3 does not either disclose a technique that resolves the above problems.

The main objective of the present invention is to provide an information-processing device and the like that resolves the above problems and improves throughput by preventing applications from stopping due to the shortage of a memory area and by reducing the application processing time needed for reserving and freeing memory.

Solution to Problem

An information processing device according to the one aspect of the present invention includes:

one or more processors acting as memory processing control unit configured to, when receiving a memory-reserving request for a memory to be used in operation processing written in an application, determine whether an area size requested by the memory-reserving request can be reserved in a free area of the memory, and, when receiving a memory-freeing request for the memory used in the operation processing written in the application, determines whether there is the memory-reserving request that is left pending;

the one or more processors acting as reserving request processing unit configured to leave the memory-reserving request pending when the memory processing control unit determines that the area size cannot be reserved; and the one or more processors acting as freeing request processing unit configured to delete or leave pending the memory-freeing request when the memory processing control unit determines that there is no memory-reserving request that is left pending.

An information processing system according to the one aspect of the present invention includes:

an information processing device; and an accelerator that is connected to the information processing device via a communication channel and comprises a second memory used for operation processing written in the application, wherein the memory processing control means included in the information processing device, in response to a second memory-reserving request for the second memory to be used for the operation processing written in the application, determines whether an area size that is requested by the second memory-reserving request can be reserved in a free area of the second memory and, in response to a second memory-freeing request for the second memory used for the operation processing written in the application, determines whether there is the second memory-reserving request that is left pending;

if the memory processing control means determines that the area size cannot be reserved, the freeing request processing means included in the information processing device leaves pending the second memory-reserving request; and if the memory processing control means determines that there is no second memory-reserving request that is left pending, the freeing request processing means included in the information processing device deletes or leaves pending the second memory-freeing request.

A memory management method according to the one aspect of the present invention includes:

when receiving a memory-reserving request for a memory to be used in operation processing written in an application, determining whether an area size requested by the memory-reserving request can be reserved in a free area of the memory, and, when receiving a memory-freeing request for the memory used in the operation processing written in the application, determines whether there is the memory-reserving request that is left pending;

leaving the memory-reserving request pending when determined that the area size cannot be reserved; and deleting or leaving pending the memory-freeing request when determined that there is no memory-reserving request that is left pending.

A program storage medium according to the one aspect of the present invention, program storage medium storing a memory management program that causes a computer to execute:

when receiving a memory-reserving request for a memory to be used in operation processing written in an application, a process that determines whether an area size requested by the memory-reserving request can be reserved in a free area of the memory, and, when receiving a memory-freeing request for the memory used in the operation processing written in the application, determines whether there is the memory-reserving request that is left pending;

a process that leaves the memory-reserving request pending when determined that the area size cannot be reserved; and a process that deletes or leaves pending the memory-freeing request when determined that there is no memory-reserving request that is left pending.

The claimed invention provides an effect of improving throughput by preventing applications from stopping due to the shortage of a memory area and by reducing time that is taken for memory reserving processing and memory freeing processing of the applications.

BRIEF DESCRIPTION OF DRAWINGS

FIG. 3A is a flowchart illustrating processing of various applications that is performed in the information-processing device according to the first exemplary embodiment of the present invention;

DESCRIPTION OF EMBODIMENTS

Figure 1:
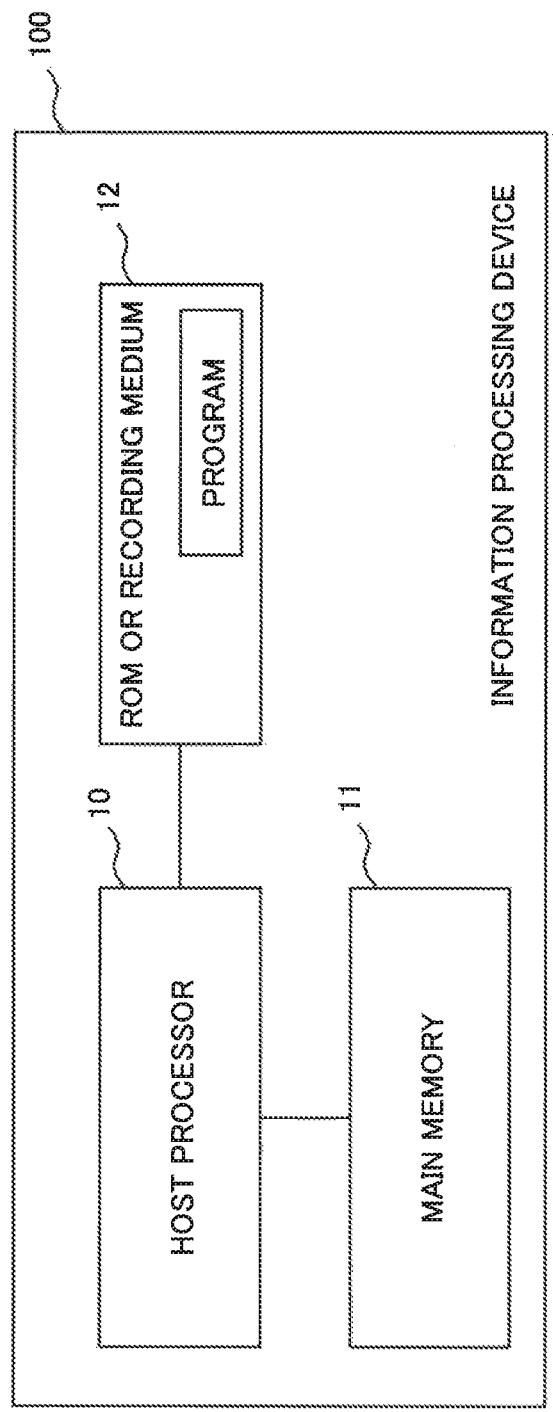
FIG. 1 is a diagram exemplifying hardware components of an information-processing device according to exemplary embodiments of the present invention.

The following will describe the details of the exemplary embodiments of the present invention with reference to the drawings. In the drawings that are referred to with reference to the exemplary embodiments, the same elements may be appended with the same signs to omit redundant description.

First Exemplary Embodiment

Figure 2:
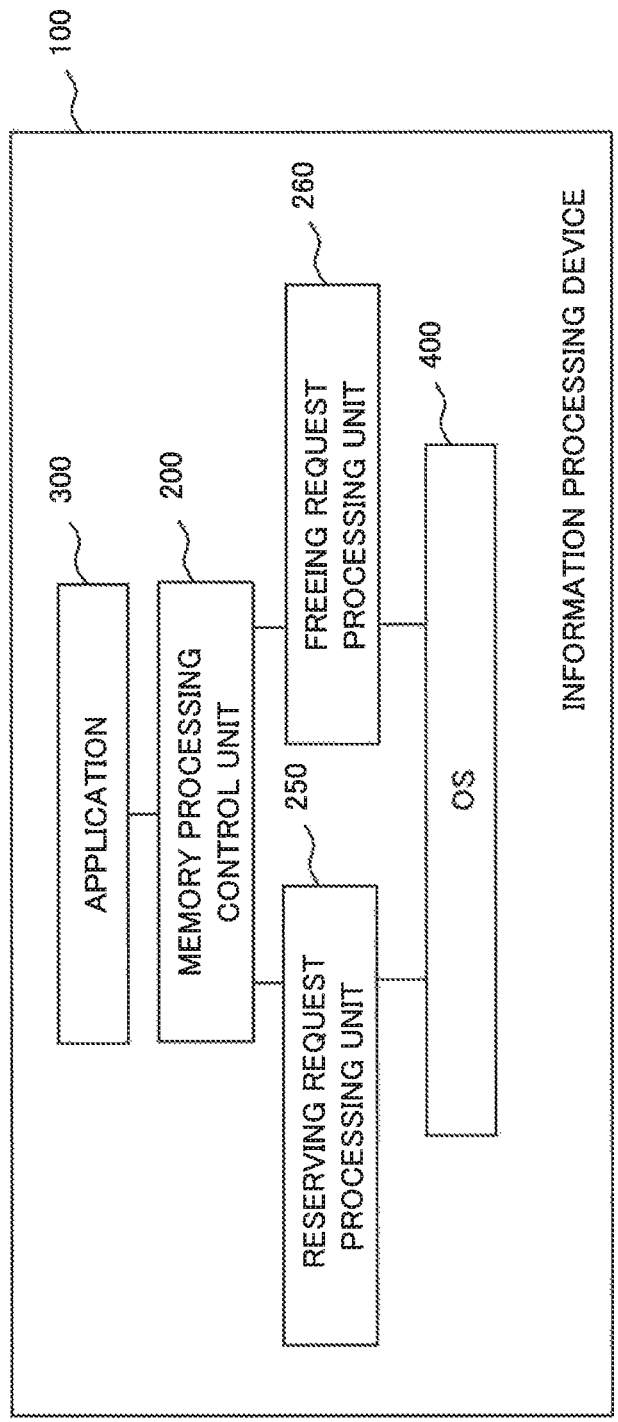
FIG. 2 is a functional block diagram illustrating components of an information-processing device according to a first exemplary embodiment of the present invention.

FIG. 1 is a diagram exemplifying hardware components of an information processing device 100 according to a first exemplary embodiment of the present invention. FIG. 2 is a functional block diagram of the information processing device 100 that is implemented using the hardware resources exemplified in FIG. 1. The components illustrated in FIG. 1 include a host processor 10, a main memory 11, and a Read Only Memory (ROM) or recording medium 12. The host processor 10 controls the overall operation of the information processing device 100 by loading a variety of software programs (computer programs) stored in the ROM or recording medium 12 onto the main memory 11 and executing the software programs. Thus, in the following exemplary embodiments, the host processor 10 executes software programs for performing each function (each unit) of the information-processing device 100 while referring to the ROM or recording medium 12 as necessary.

As illustrated in FIG. 2, the information processing device 100 includes a memory processing control unit 200, a reserving request processing unit 250, a freeing request processing unit 260, an application 300, and an OS 400.

The application 300 is one or a plurality of application programs each including one or a plurality of programs in which program codes for performing predetermined processing are written. The application 300 is stored in the ROM or recording medium 12 illustrated in FIG. 1 and executed by the host processor 10 illustrated in FIG. 1 in response to an instruction from a user or a call from another application. The OS 400 is also stored in the ROM or recording medium 12 illustrated in FIG. 1 and executed by the host processor 10 illustrated in FIG. 1.

FIG. 3A is a flowchart illustrating processing of various applications 300 that is executed in the information processing device 100. Preceding operation processing, the application 300 executes a request for transferring to processing for reserving memory (memory reserving processing) and processing for freeing memory (memory freeing processing). In particular, the host processor 10, on executing the application 300, first, outputs a memory-reserving request for data to be used in the operation processing and performs the memory reserving processing in response to the request with the OS 400 (S301). In such a case, in accordance with the memory-reserving request, the OS 400 reserves the requested memory area of the main memory 11 and returns information, such as an address, indicating the memory area to the application 300.

When the memory is reserved, the host processor 10 executes the operation processing of the application 300 using the above reserved area of the main memory 11 (S302). When the operation processing ends, the host processor 10 outputs a memory-freeing request for freeing the area of the main memory 11 used in the operation processing and performs the memory freeing processing in accordance with the request with the OS 400 (S303). In such a case, the OS 400 frees the area of the main memory 11 that is designated by the memory-freeing request to make the area available for other memory-reserving requests. The host processor 10 subsequently performs S304 to S306 that are the same processing as S301 to S303. As such, the application 300 performs a series of processing including reserving memory, performing operation, and freeing memory in execution of all the written operation processing.

Figure 3B:
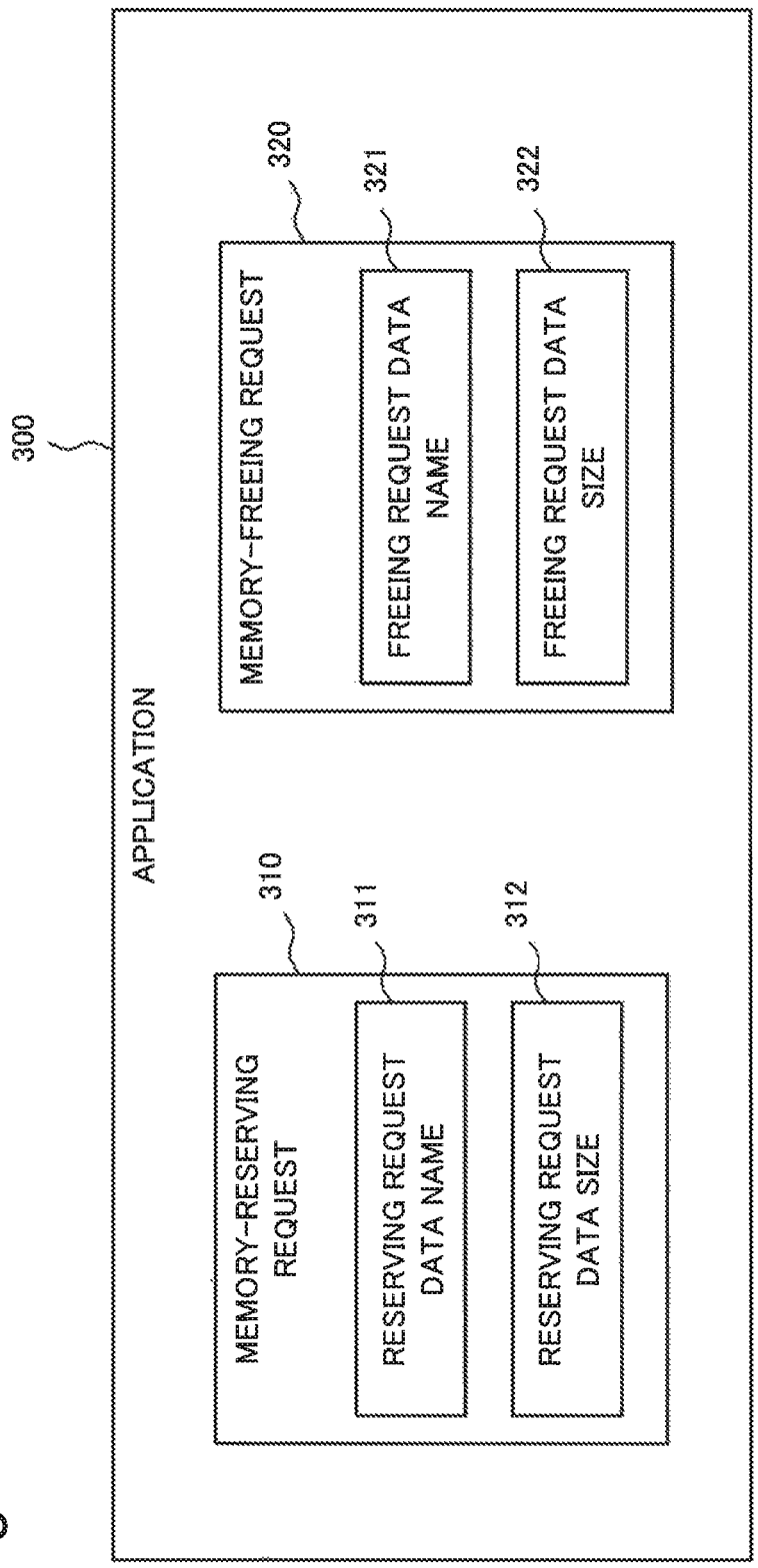
FIG. 3B is a diagram illustrating components of a memory-reserving request and a memory-freeing request included in the various applications that are performed in the information-processing device according to the first exemplary embodiment of the present invention.

As schematically illustrated in FIG. 3B, the application 300 includes a memory-reserving request 310 and a memory-freeing request 320. The memory-reserving request 310 includes a reserving request data name 311 and a reserving request data size 312. Further, the memory-freeing request 320 includes a freeing request data name 321 and a freeing request data size 322. The reserving request data name 311 is identification information of data that uses a memory area reserved in the main memory 11. The reserving request data size 312 indicates an area size needed to be used by the data. The freeing request data name 321 is identification information of data that is using a memory area to be freed. The freeing request data size 322 indicates the size of a memory area to be freed.

Figure 4:
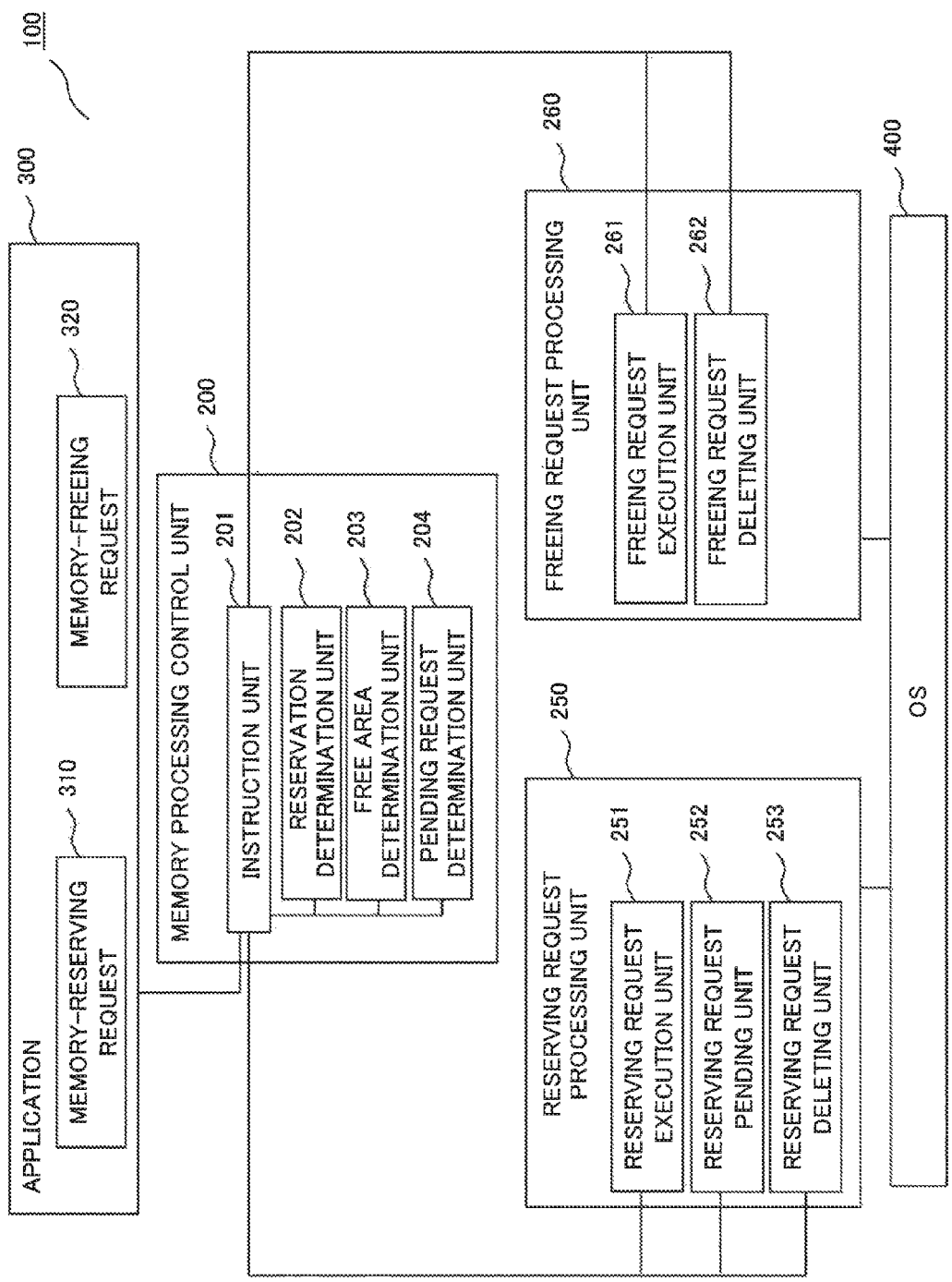
FIG. 4 is a block diagram illustrating detailed components of the information-processing device according to the first exemplary embodiment of the present invention.

FIG. 4 is a block diagram illustrating detailed components of the information-processing device 100 illustrated in FIG. 2. As illustrated in FIG. 4, a memory processing control unit 200 of the information processing device 100 includes an instruction unit 201, a reservation determination unit 202, a free area determination unit 203, and a pending request determination unit 204.

A reserving request processing unit 250 includes a reserving request execution unit 251, a reserving request pending unit 252, and a reserving request deleting unit 253. A freeing request processing unit 260 includes a freeing request execution unit 261 and a freeing request deleting unit 262.

The memory processing control unit 200 receives the memory-reserving request 310 and a memory-freeing request 320 from the application 300, as well as, controls memory processing (that is, memory reserving processing and memory freeing processing) in response to each request. The reserving request processing unit 250 executes memory reserving processing with the OS 400 in response to the memory-reserving request 310 that the memory processing control unit 200 received. The freeing request processing unit 260 executes memory freeing processing with the OS 400 in response to the memory-freeing request 320 that the memory processing control unit 200 received.

Figure 5:
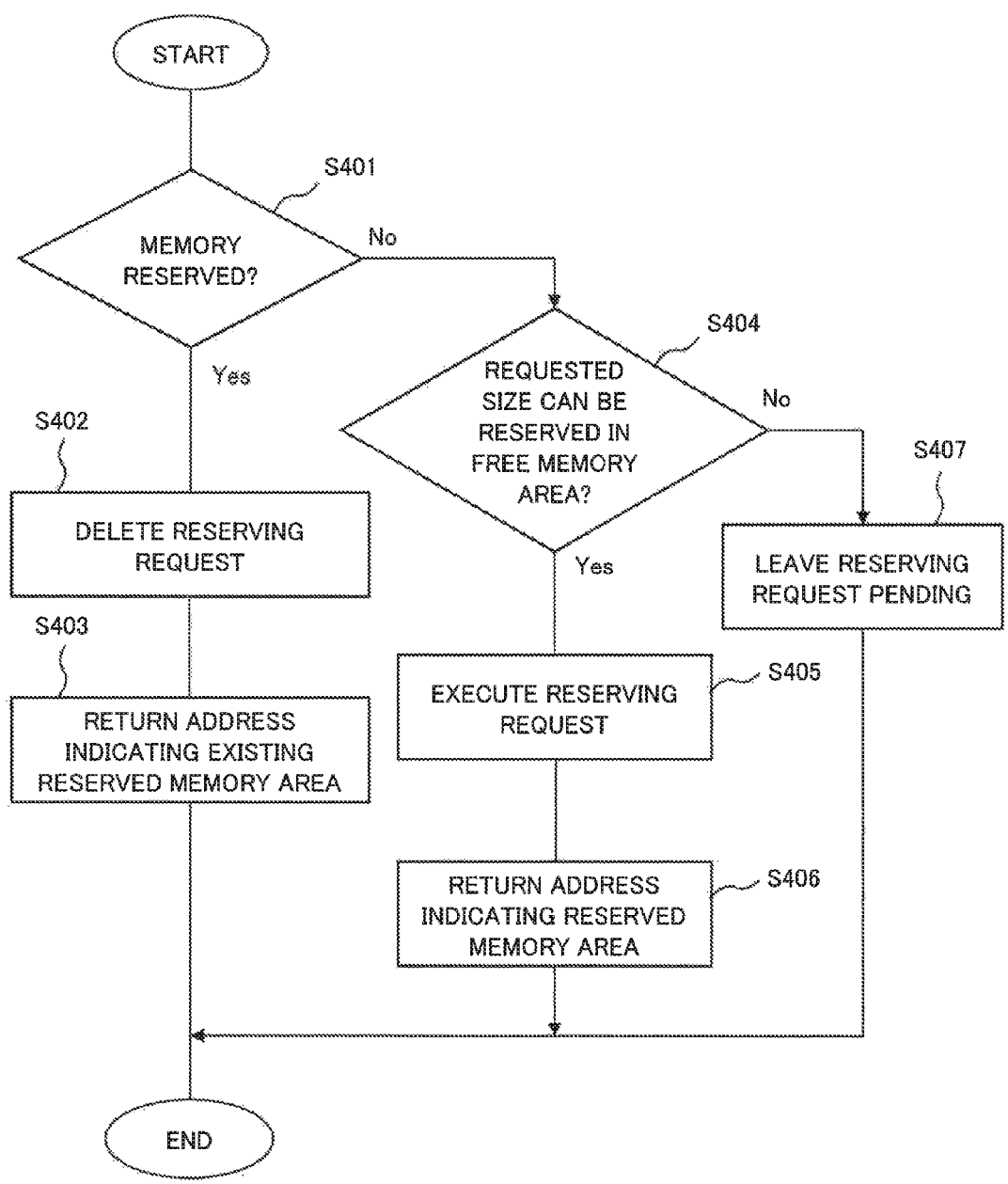
FIG. 5 is a flowchart illustrating processing relating to reserving memory in the information-processing device according to the first exemplary embodiment of the present invention.

FIG. 5 is a flowchart illustrating processing relating to reserving memory in the information processing device 100 according to the first exemplary embodiment. The processing relating to reserving memory in the information processing device 100 will be described with reference to FIG. 5.

The application 300, when being activated in response to an instruction from a user, a call by other application, or the like, transmits the memory-reserving request 310 to the memory processing control unit 200. In response to the received memory-reserving request 310, the memory processing control unit 200 determines whether to execute, leave pending, or delete the memory-reserving request, as well as, transmits an instruction for performing the determined processing to the reserving request processing unit 250.

In particular, in the memory processing control unit 200, the instruction unit 201 instructs the reservation determination unit 202 to judge whether a memory area has been reserved for data, for which reserving of memory is requested. The reservation determination unit 202 determines whether a memory area has been reserved for the data which requests memory reserving, on the basis of the reserving request data name 311 included in the received memory-reserving request 310 (S401). The reservation determination unit 202 returns the determination result and, if a memory area has been reserved, information, such as an address, indicating the memory area to the instruction unit 201.

If a memory area has been reserved (Yes at S401), the instruction unit 201 instructs the reserving request processing unit 250 to delete the memory-reserving request 310.

When receiving an instruction of deleting the memory-reserving request 310 from the instruction unit 201, the reserving request processing unit 250 uses the reserving request deleting unit 253 to delete the memory-reserving request 310 (S402). Then, the instruction unit 201 returns information, such as an address, indicating the memory area that is determined by the reservation determination unit 202 as having been reserved to the application 300 (S403).

On the other hand, if the above memory area has not been reserved at S401 (No at S401), the instruction unit 201 instructs the free area determination unit 203 to judge whether the memory area can be reserved. The free area determination unit 203 determines whether the requested area size can be reserved in the free area by comparing the size of the free area of the memory with the reserving request data size 312 included in the above memory-reserving request 310 in response to the instruction (S404).

If it is determined that the reserving is possible (Yes at S404), the instruction unit 201 instructs the reserving request processing unit 250 to perform the memory reserving processing. If it is determined that the reserving is not possible (No at S404), the instruction unit 201 instructs the reserving request processing unit 250 to leave pending the memory-reserving request.

The reserving request processing unit 250 uses the reserving request execution unit 251 to execute reserving of memory in accordance with the instruction of executing the above memory-reserving request (S405). In particular, the reserving request execution unit 251 executes memory reserving processing in accordance with the memory-reserving request with the OS 400, as well as, returns information indicating the reserved memory area that is acquired from the OS 400 to the memory processing control unit 200. The memory processing control unit 200 returns the information indicating the reserved memory area to the application 300 (S406).

The memory reserving processing and the memory freeing processing can be performed by general methods, thus, the detailed description thereof are omitted in the first exemplary embodiment. For example, the above-described PTL 3 discloses a method of reserving a memory area, if a program requires to dynamically reserve a memory area, by calling a function for reserving a memory area based on a heap operation prepared by a library of the programming language or the OS. PTL 3 further discloses invocation of a function of freeing the memory area after the reserved memory area is used in the program.

On the other hand, the reserving request processing unit 250 uses the reserving request pending unit 252 to leave pending the memory-reserving request in response to the instruction to leave the memory-reserving request pending from the memory processing control unit 200 (S407). If the memory-reserving request is left pending, the application 300 pauses the memory reserving processing.

As described above, the information processing device 100 performs processing in response to the memory-reserving request 310 from the application 300.

Figure 6:
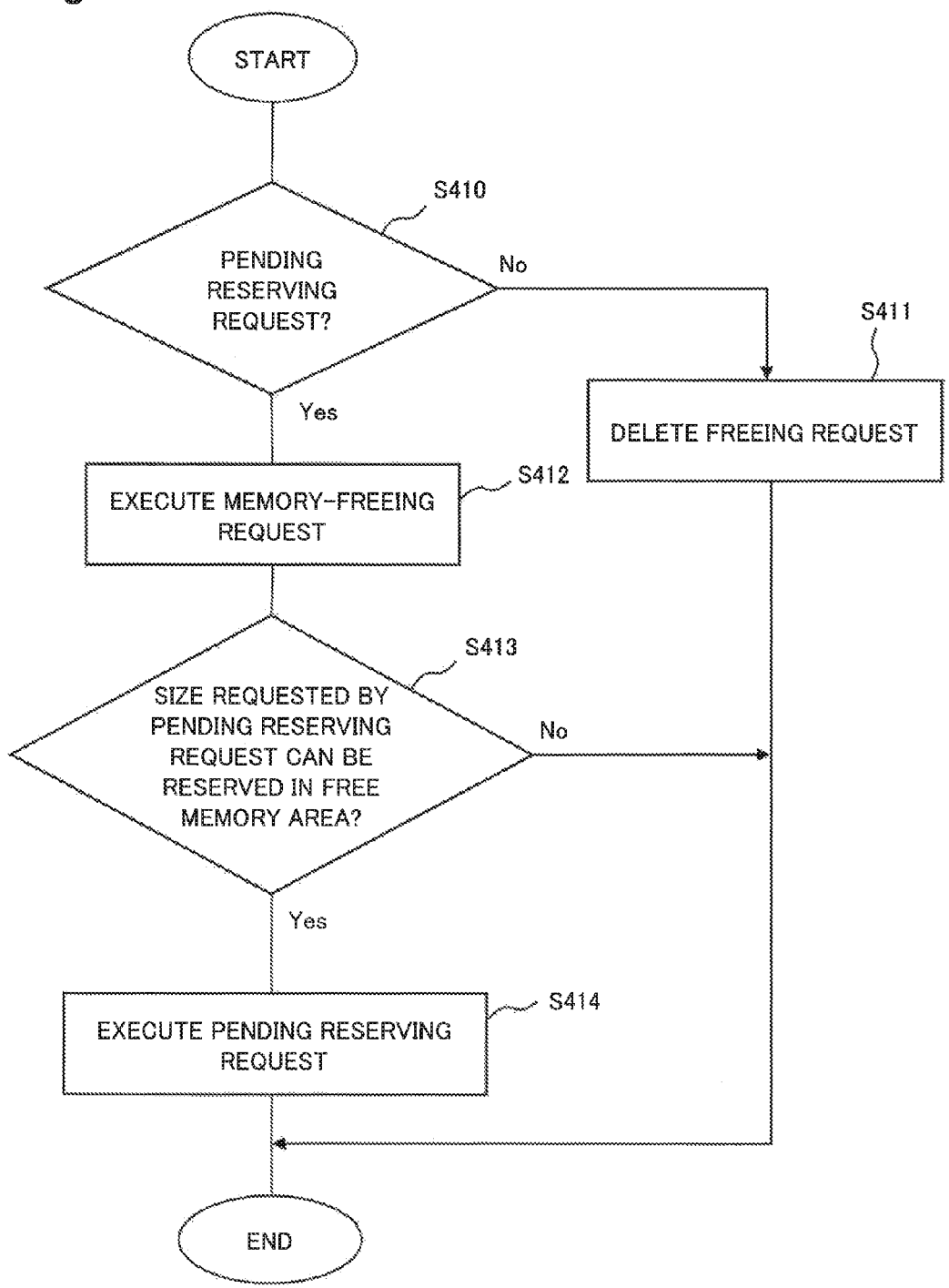
FIG. 6 is a flowchart illustrating processing relating to freeing memory in the information-processing device according to the first exemplary embodiment of the present invention.

FIG. 6 is a flowchart illustrating processing relating to freeing memory in the information processing device 100 according to the first exemplary embodiment. The processing relating to freeing memory in the information processing device 100 will be described with reference to FIG. 6.

The memory processing control unit 200, when receiving a memory-freeing request 320 from the application 300, determines whether to execute or delete the memory-freeing request or execute the memory-reserving request that is left pending. Then, the memory processing control unit 200 transmits an instruction of performing the determined processing to the reserving request processing unit 250 or the freeing request processing unit 260.

In particular, the instruction unit 201 instructs the pending request determination unit 204 to determine whether there is the memory-reserving request that is left pending to determine whether to delete the memory-freeing request. In accordance with the above instruction, the pending request determination unit 204 determines whether there is the memory-reserving request that is left pending (S410). The pending request determination unit 204 may, for example, retain information relating to the memory-reserving request that is left pending at the above S407 in FIG. 5. The pending request determination unit 204 returns the determination result to the instruction unit 201.

If there is no memory-reserving request that is left pending, the instruction unit 201 instructs the freeing request processing unit 260 to delete the memory-freeing request 320, while, if there is the memory-reserving request that is left pending, the instruction unit 201 instructs the freeing request processing unit 260 to execute the memory-freeing request 320.

The freeing request processing unit 260, in accordance with the instruction of deleting the above memory-freeing request 320, uses the freeing request deleting unit 262 to delete the memory-freeing request 320 from the application 300 (S411).

On the other hand, the freeing request processing unit 260, in accordance with the instruction of executing the above memory-freeing request 320, uses the freeing request execution unit 261 to execute the memory-freeing request 320 with the OS 400 (S412). The OS 400 frees the memory area designated by the freeing request data name 321 and the freeing request data size 322 included in the memory-freeing request 320.

The freeing request execution unit 261 returns a report that the freeing of the above memory area has been executed to the instruction unit 201. Next, the instruction unit 201 instructs the free area determination unit 203 to determine whether the memory-reserving request 310 that is left pending can be executed.

In accordance with the above instruction, the free area determination unit 203 determines whether the requested memory area can be reserved by comparing the size of the free area including the memory area that has been freed as described above with the area size requested by the memory-reserving request that is left pending (S413). The free area determination unit 203 returns determination result to the instruction unit 201.

If the reserving is possible, the instruction unit 201 instructs the reserving request processing unit 250 to execute memory reserving processing in accordance with the memory-reserving request that is left pending. If the reserving is not possible, the instruction unit 201 ends the processing.

In response to the instruction, the reserving request processing unit 250 executes memory reserving processing in accordance with the memory-reserving request that is left pending (S414).

As described above, according to the first exemplary embodiment, the information processing device 100 includes a memory processing control unit 200 that receives the memory-reserving request 310 and a memory-freeing request 320 from the application 300. The memory processing control unit 200 uses the free area determination unit 203 to determine whether the area size requested by the memory-reserving request 310 can be reserved in the free area of the main memory 11. If the reserving is not possible, the memory processing control unit 200 instructs the reserving request processing unit 250 to leave pending the memory-reserving request 310. That is, if the free area is not sufficient, the memory processing control unit 200 temporarily leaves pending the memory-reserving request 310 and reserves memory at the timing when the memory is freed by other memory-freeing request 320. According to the first exemplary embodiment, such a configuration provides an effect of preventing the application 300 from stopping due to an error caused by the shortage of a memory area.

Further, if the reservation determination unit 202 determines that the memory-reserving request 310 is for the identical data as data for which memory has been reserved, the memory processing control unit 200 deletes the memory-reserving request 310. Further, if the pending request determination unit 204 determines that there is no memory-reserving request 310 that is left pending, the memory processing control unit 200 deletes the memory-freeing request 320. According to the first exemplary embodiment, such a configuration enables deleting of the memory-reserving request and the memory-freeing request by keeping a reserved memory area reserved if there is a sufficient free area in the memory (as the result, memory reserving processing and memory freeing processing can be reduced). This provides an effect of reducing the total time for such memory processing.

Second Exemplary Embodiment

Figure 7:
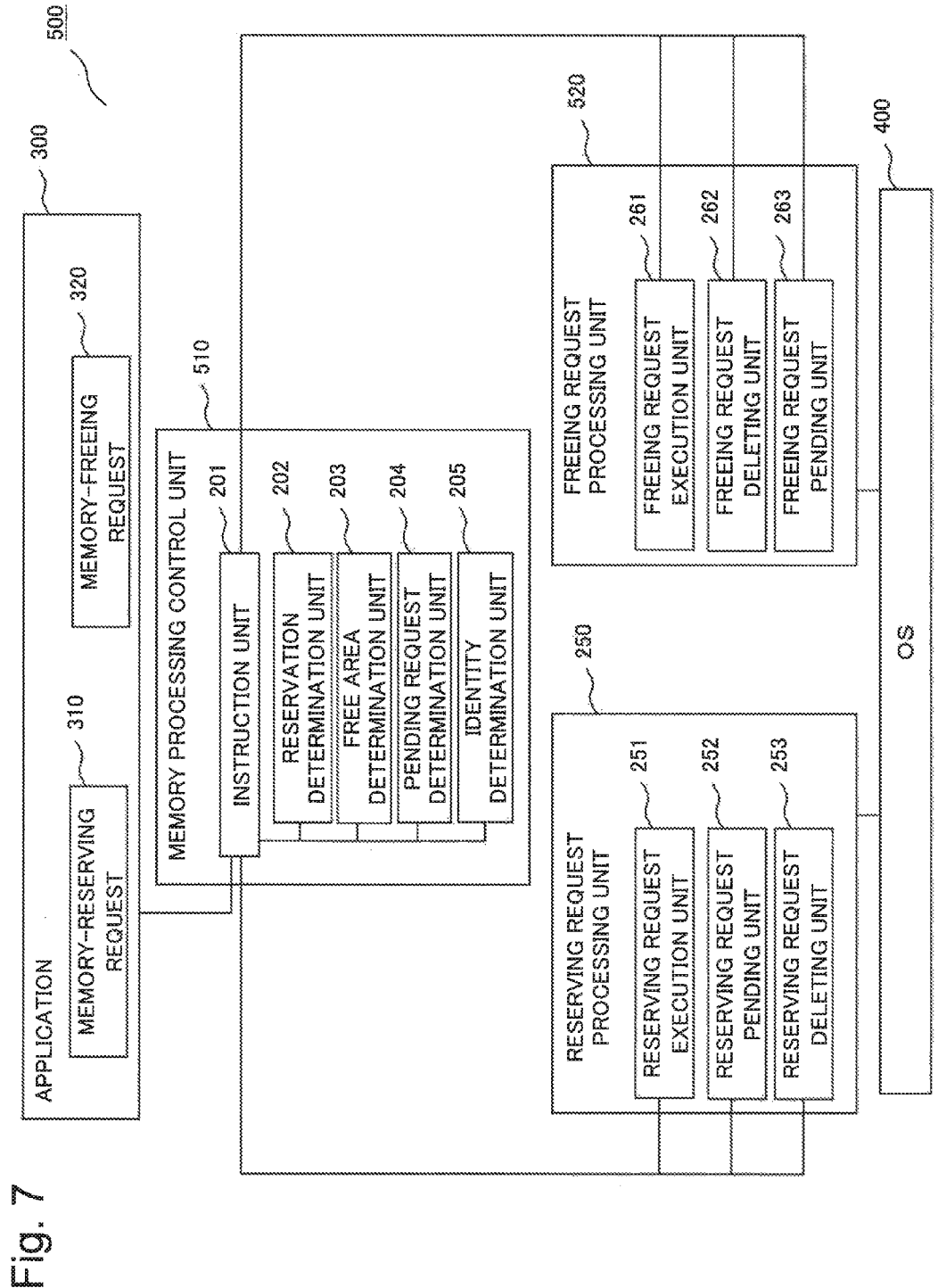
FIG. 7 is a block diagram illustrating components of an information-processing device according to a second exemplary embodiment of the present invention.

FIG. 7 is a functional block diagram of an information processing device 500 according to a second exemplary embodiment of the present invention. The components illustrated in FIG. 7 include a memory processing control unit 510 and a freeing request processing unit 520, instead of the memory processing control unit 200 and the freeing request processing unit 260 of the information processing device 100 according to the first exemplary embodiment.

The memory processing control unit 510 includes an identity determination unit 205 in addition to the components of the memory processing control unit 200 as described in the first exemplary embodiment. The freeing request processing unit 520 includes a freeing request pending unit 263 in addition to the components of the freeing request processing unit 260 as described in the first exemplary embodiment.

Figure 8:
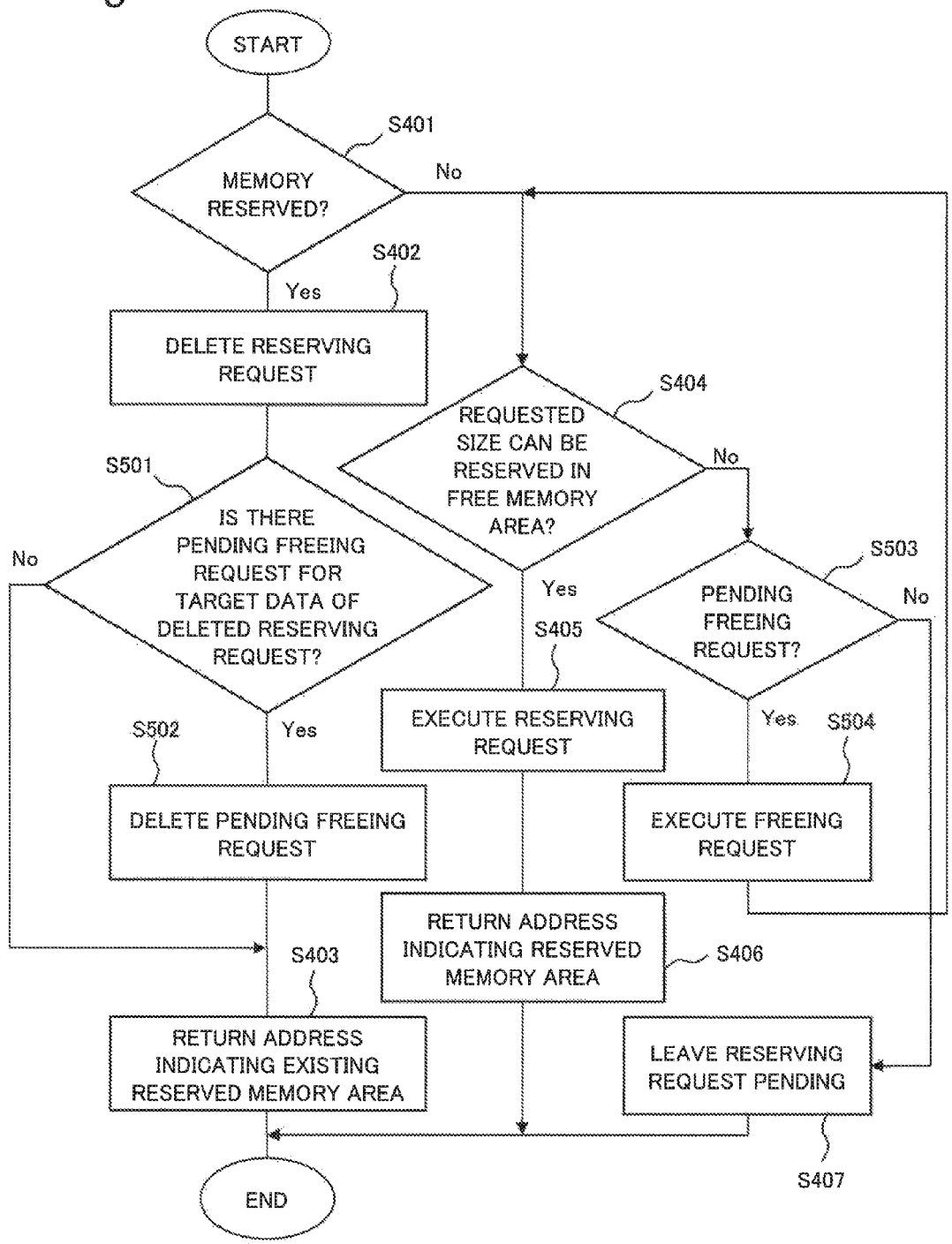
FIG. 8 is a flowchart illustrating processing relating to reserving memory in the information-processing device according to the second exemplary embodiment of the present invention.

FIG. 8 is a flowchart illustrating processing relating to reserving memory in the information processing device 500 according to the second exemplary embodiment. FIG. 8 includes S501 to S504 in addition to the processing included in the flowchart illustrated in FIG. 5 of the first exemplary embodiment.

The processing relating to reserving memory in the information processing device 500 will be described with reference to FIGS. 7 and 8.

The application 300, when being activated in response to an instruction from a user, a call by other application, or the like, transmits the memory-reserving request 310 to the memory processing control unit 510. In response to the received memory-reserving request 310, the memory processing control unit 510 determines whether to execute, leave pending, or delete the memory-reserving request or execute or delete a memory-freeing request that is left pending. Then, the memory processing control unit 510 transmits an instruction of performing the determined processing to the reserving request processing unit 250 or the freeing request processing unit 520.

Specifically, the reservation determination unit 202 determines whether a memory area has been reserved for data, for which reserving of memory is requested, on the basis of the reserving request data name 311 included in the received memory-reserving request 310 (S401). If a memory area has been reserved (Yes at S401), the instruction unit 201 instructs the reserving request processing unit 250 to delete the memory-reserving request 310. Here, the identity determination unit 205 retains the reserving request data name 311 and reserving request data size 312 included in the memory-reserving request 310.

The reserving request processing unit 250, when receiving an instruction of deleting the memory-reserving request 310 from the instruction unit 201, instructs the reserving request deleting unit 253 to delete the memory-reserving request 310 (S402).

The instruction unit 201 instructs the identity determination unit 205 to determine the identity of the memory-reserving request 310. In accordance with the instruction, the identity determination unit 205 determines the identity of the memory-reserving request 310 on the basis of the retained reserving request data name 311. In particular, the identity determination unit 205 determines whether there is the memory-reserving request that is left pending for the identical data from the identical application as the application that issues the memory-reserving request 310 (S501). The identity determination unit 205 returns determination result to the instruction unit 201.

If there is the memory-freeing request that is left pending, the instruction unit 201 transmits an instruction of deleting the memory-freeing request to the freeing request processing unit 520. The freeing request processing unit 520 uses the freeing request deleting unit 262 to delete the memory-freeing request that is left pending (S502).

Then, the instruction unit 201 returns information, such as an address, indicating the memory area that is determined by the reservation determination unit 202 as having been reserved at S401 to the application 300 (S403).

On the other hand, if the above memory area has not been reserved at S401, the instruction unit 201 instructs the free area determination unit 203 to determine whether the memory area can be reserved. In accordance with the instruction, the free area determination unit 203 determines whether the requested area size can be reserved in the free area by comparing the size of the free area of the memory with the reserving request data size 312 included in the above memory-reserving request 310 (S404).

If the reserving is possible (Yes at S404), the instruction unit 201 performs S405 and S406 in the same way as the first exemplary embodiment.

On the other hand, if the reserving is not possible (No at S404), the instruction unit 201 determines whether there is the memory-freeing request that is left pending before leaving pending the memory-reserving request as described in the first exemplary embodiment (S407). If there is the memory-freeing request that is left pending, the instruction unit 201 makes a free area by executing the memory-freeing request.

In particular, the instruction unit 201 instructs the pending request determination unit 204 to determine whether there is the memory-freeing request that is left pending. In accordance with the above instruction, the pending request determination unit 204 determines whether there is the pending memory-freeing request that is left pending (S503). The pending request determination unit 204 may retain information relating to the memory-freeing request that is left pending, for example, at S550 in FIG. 9 as will be described later. The pending request determination unit 204 returns determination result to the instruction unit 201.

If there is no memory-freeing request that is left pending, the instruction unit 201 instructs the reserving request processing unit 250 to leave the memory-reserving request 310 pending.

In response to the pending instruction of the above-described memory-reserving request 310, the reserving request processing unit 250 uses the reserving request pending unit 252 to leave pending the memory-reserving request 310 (S407). On the other hand, if there is the memory-freeing request that is left pending, the instruction unit 201 instructs the freeing request processing unit 520 to execute the memory-freeing request 320. In accordance with the instruction of executing the above memory-freeing request 320, the freeing request processing unit 520 uses the freeing request execution unit 261 to execute the memory-freeing request 320 (S504). Subsequently, the instruction unit 201 returns the processing to S404 and determines whether the area size requested by the memory-reserving request 310 can be reserved in the free memory area including the memory that has been freed by execution of the memory-freeing request 320.

As described above, the information processing device 500 performs processing in response to the memory-reserving request 310 from the application 300.

Figure 9:
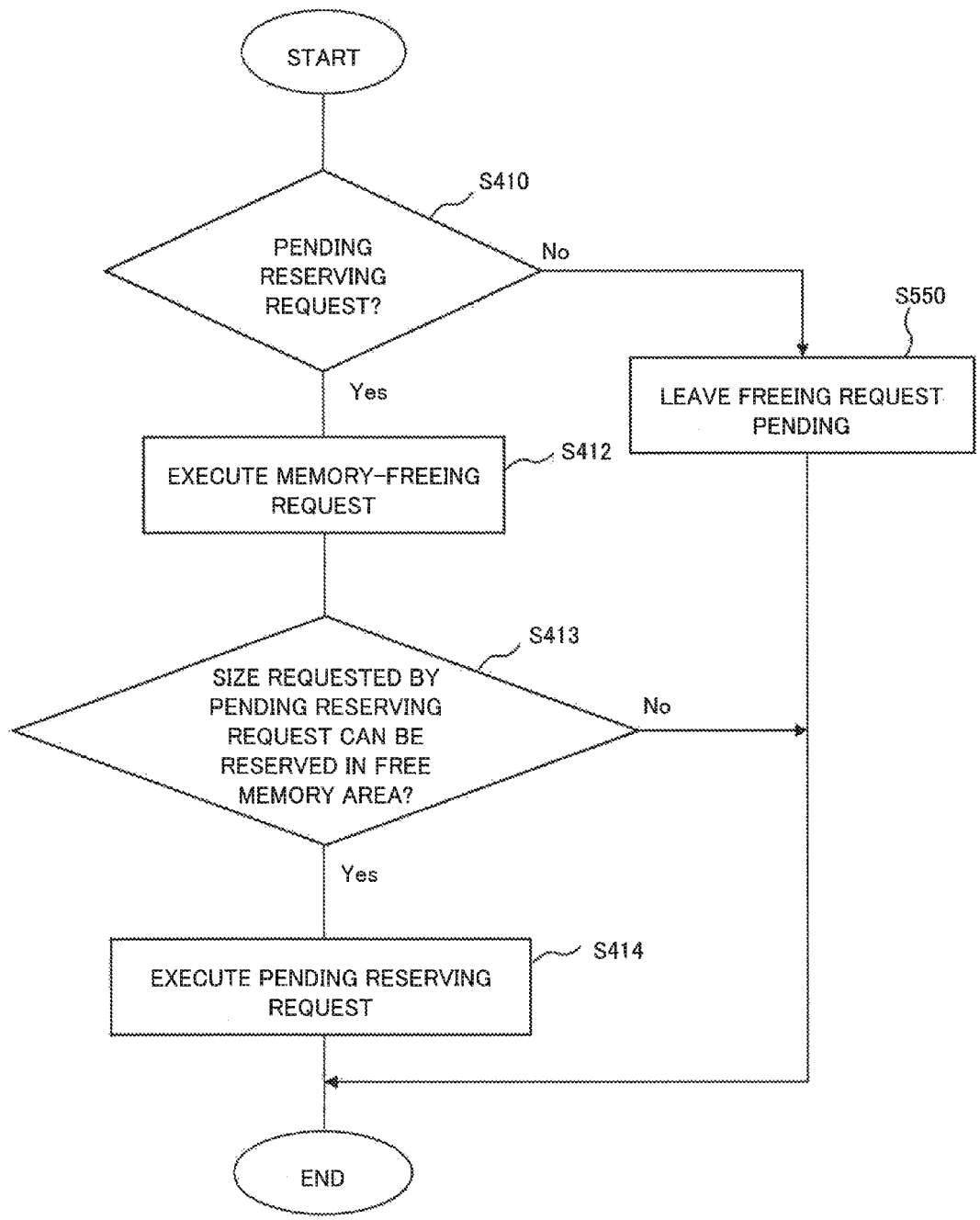
FIG. 9 is a flowchart illustrating processing relating to freeing memory in the information-processing device according to the second exemplary embodiment of the present invention.

FIG. 9 is a flowchart illustrating processing relating to freeing memory in the information processing device 500 according to the second exemplary embodiment. The processing relating to freeing memory in the information processing device 500 will be described with reference to FIG. 9.

The memory processing control unit 510, when receiving a memory-freeing request 320 from the application 300, determines whether to execute or leave pending the memory-freeing request or execute the pending memory-reserving request. Then, the memory processing control unit 510 transmits an instruction of performing the determined processing to the reserving request processing unit 250 or the freeing request processing unit 520.

The instruction unit 201 performs the same processing as the first exemplary embodiment for S410 to S414 in FIG. 9.

At S410, the instruction unit 201 instructs the pending request determination unit 204 to determine whether there is the memory-reserving request that is left pending. In accordance with the above instruction, the pending request determination unit 204 determines whether there is the pending memory-reserving request that is left pending (S410). The pending request determination unit 204 may retain information relating to the memory-reserving request that is left pending, for example, at S407 in FIG. 8. The pending request determination unit 204 returns the determination result to the instruction unit 201.

If there is no memory-reserving request that is left pending, the instruction unit 201 instructs the freeing request processing unit 520 to leave pending the memory-freeing request 320. In accordance with the above instruction, the freeing request processing unit 520 uses the freeing request pending unit 263 to leave pending the memory-freeing request 320 (S550). Here, the pending request determination unit 204 retains information relating to the memory-freeing request that is left pending. As such, according to the second exemplary embodiment, if there is no memory-reserving request 310 that is left pending when receiving a memory-freeing request 320, the memory processing control unit 510 instructs to leave pending of the memory-freeing request 320. If the requested area size cannot be reserved in the free area when receiving a memory-reserving request 310, the memory processing control unit 510 instructs execution of the memory freeing processing in accordance with the memory-freeing request that is left pending. That is, if there is no memory-reserving request 310 that is left pending, the information processing device 500 does not free the reserved memory, yet, keep reserving the memory by leaving the memory-freeing request 320 pending. According to the second exemplary embodiment, such a configuration can provide an effect of reducing pending time of the memory-reserving request 310 caused by the shortage of memory, since the memory is kept reserved by leaving the memory-freeing request pending as long as a requested size can be reserved in a free area.

Third Exemplary Embodiment

Figure 10:
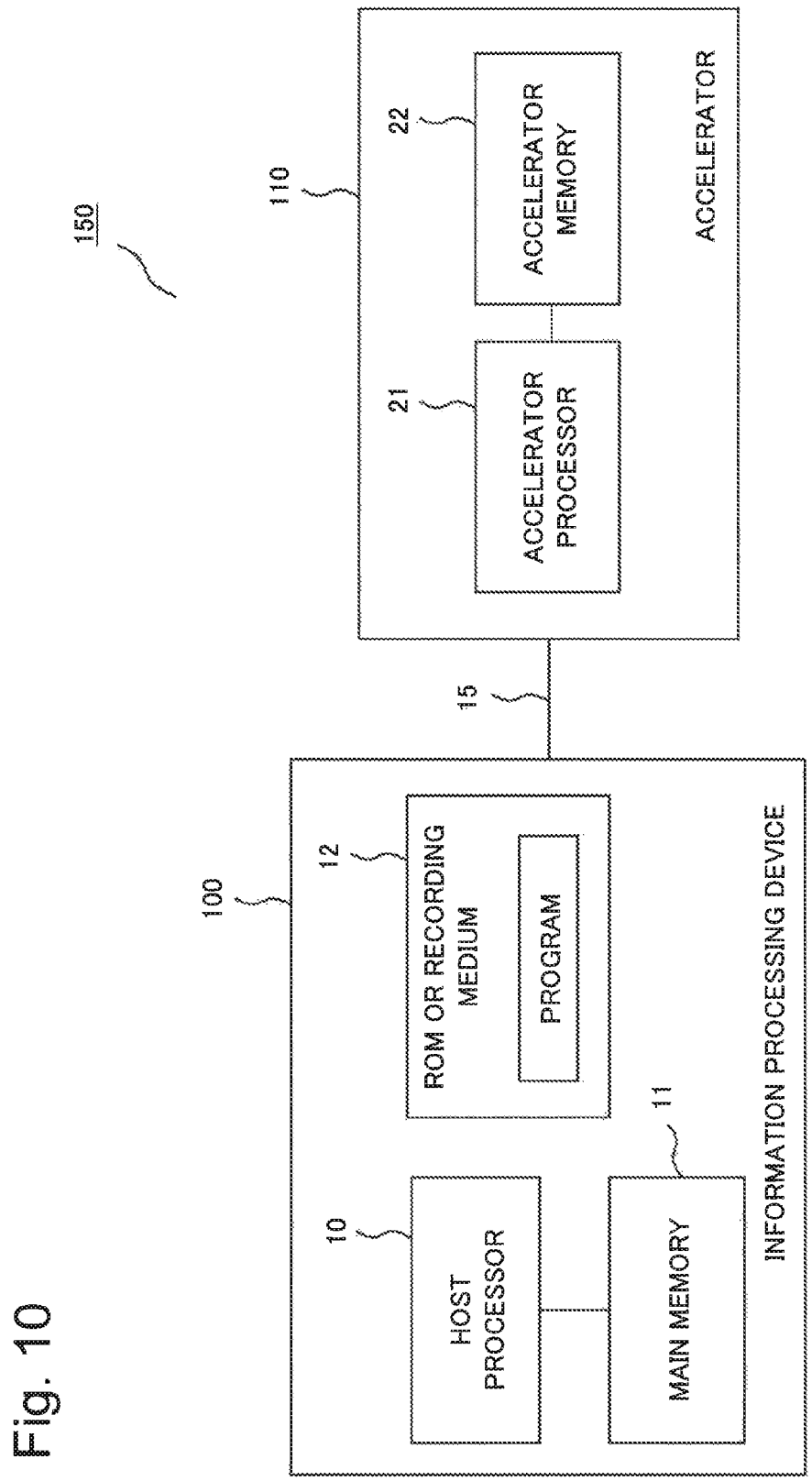
FIG. 10 is a diagram exemplifying hardware components of an information-processing system according to a third exemplary embodiment of the present invention.

FIG. 10 is a diagram illustrating hardware components of the information processing system 150 according to a third exemplary embodiment. As illustrated in FIG. 10, the information-processing system 150 includes an information processing device 100 and an accelerator 110 that is connected to the information processing device 100 via a communication channel 15.

The information processing device 100 includes the same components as those described in the first exemplary embodiment with reference to FIGS. 1 and 2.

The accelerator 110 includes an accelerator processor 21 and an accelerator memory 22. The accelerator 110 operates in accordance with an instruction from the host processor 10. In particular, the accelerator processor 21 executes operation processing written in the application while using the accelerator memory 22 in accordance with the instruction from the host processor 10.

Figure 11A:
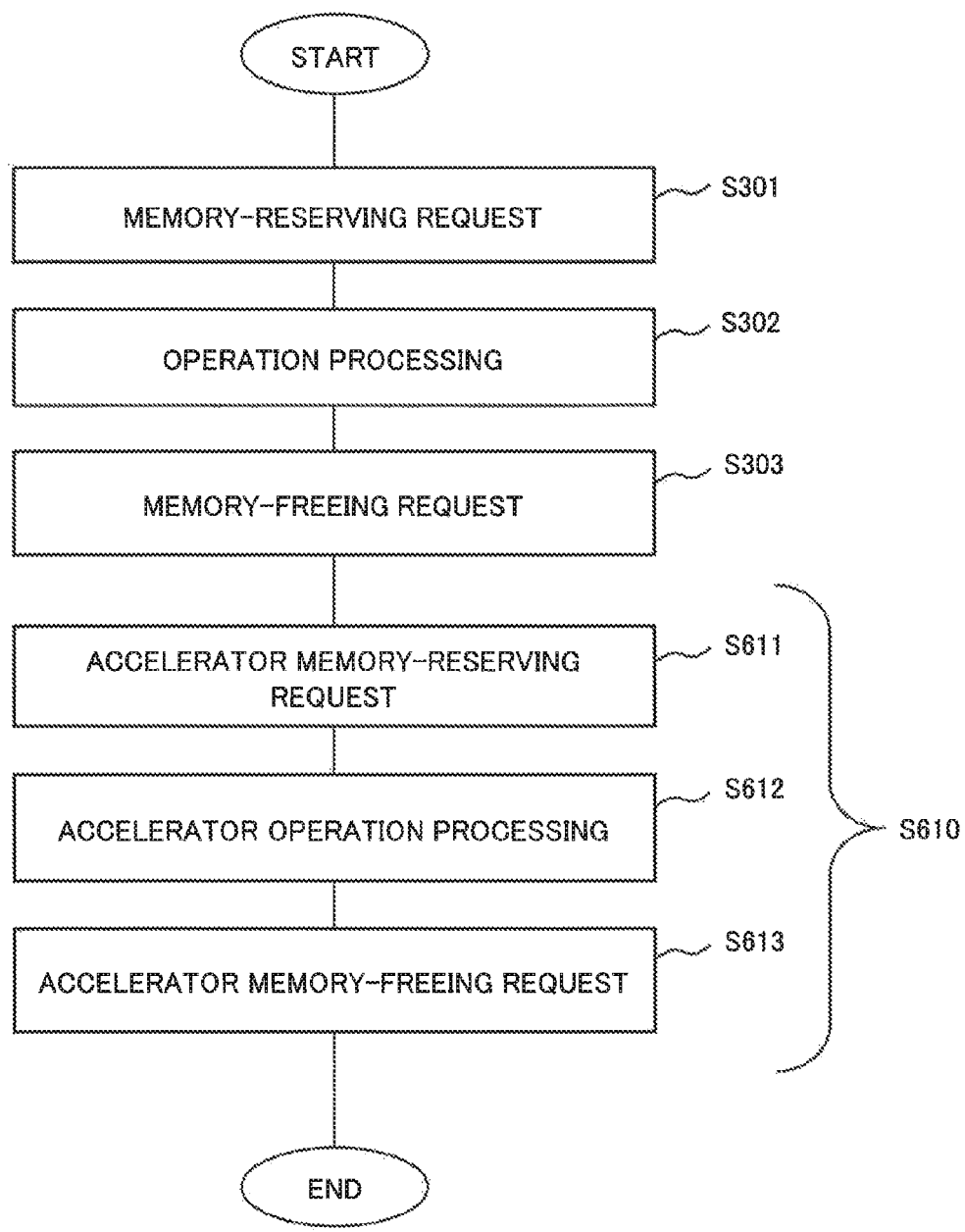
FIG. 11A is a flowchart illustrating processing of various applications, which is performed in the information-processing device according to the third exemplary embodiment of the present invention.
Figure 11B:
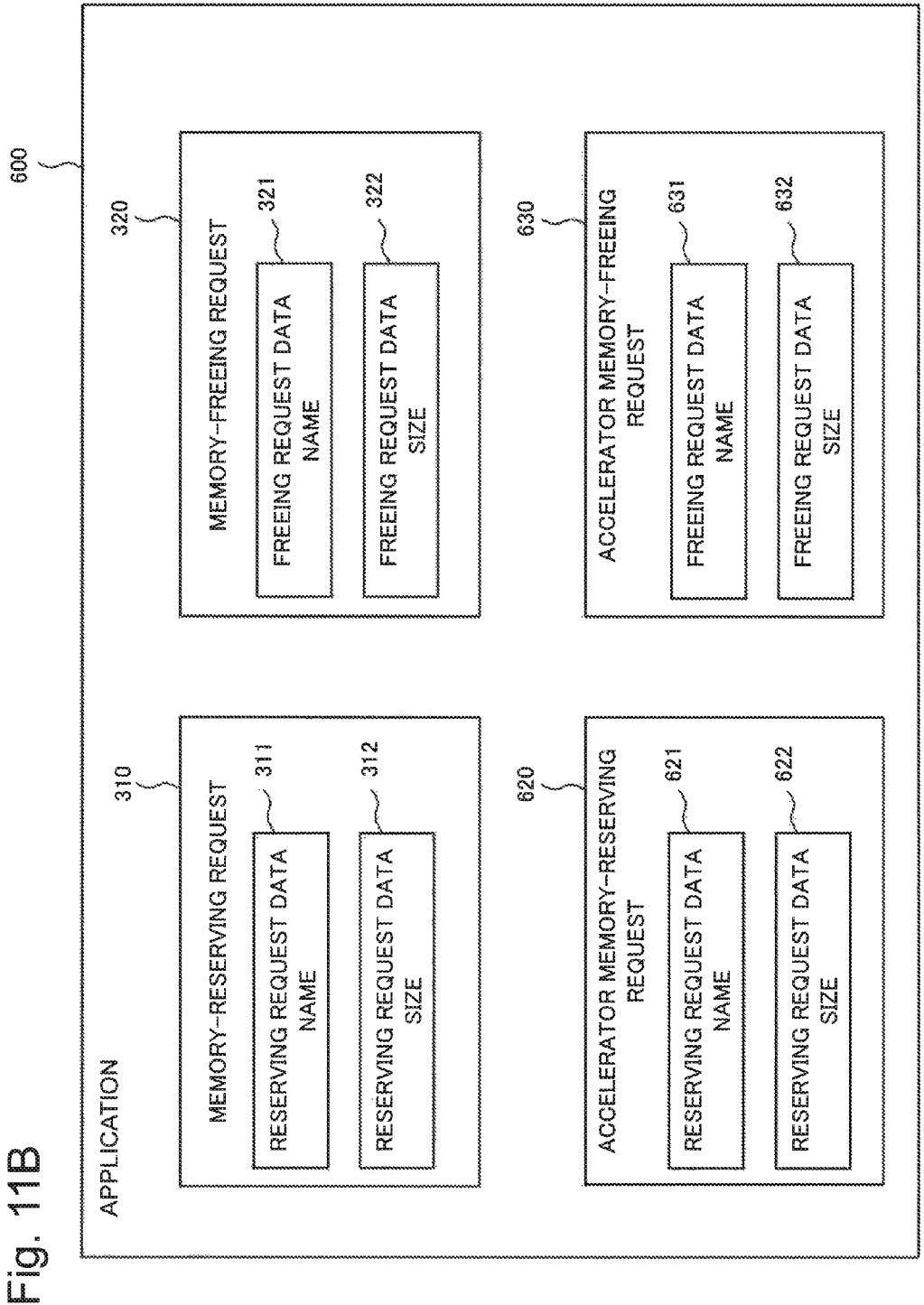
FIG. 11B is a diagram illustrating components of an accelerator memory-reserving request and an accelerator memory-freeing request included in various applications that are executed in the information-processing device according to the third exemplary embodiment of the present invention.

FIG. 11A is a flowchart illustrating processing of an application 600 illustrated in FIG. 11B that is executed in the information processing system 150 that is mounted with an accelerator 110 as illustrated in FIG. 10. The application 600 executes a request for transferring to the memory reserving processing (S301), operation processing executed by the host processor (S302), a request for transferring to the memory freeing processing (S303) and offload processing of S610.

The processing illustrated in S301 to S303 is processing where the host processor 10 executes the application 600 using the main memory 11. The offload processing S610 is processing where the host processor 10 controls the accelerator 110 to execute the application 600.

The application 600 executes an accelerator memory-reserving request for reserving a predetermined area in the accelerator memory 22 (S611) and accelerator operation processing that is executed by the accelerator processor 21 (S612). Further, the application 600 executes an accelerator memory-freeing request (S613) for freeing the accelerator memory 22.

The host processor 10 executes the application 600 in the main memory 11, as well as, manages the operation of the accelerator processor 21 in the accelerator 110 and the memory-reserving request and the memory-freeing request for the accelerator memory 22.

On execution of the application 600, the host processor 10 executes S301 to S303 in the same way as the first exemplary embodiment. Subsequently, the host processor 10 uses the accelerator 110 to execute the offload processing S610. In particular, the host processor 10 outputs an accelerator memory-reserving request (S611) for reserving an area of the accelerator memory 22 for data to be used in the accelerator operation processing (S612). Then, the host processor 10 performs accelerator memory reserving processing in response to the request with the OS (not illustrated) of the accelerator 110. In response to the accelerator memory-reserving request, the OS of the accelerator 110 reserves a requested memory area of the accelerator memory 22, as well as, returns information, such as an address, indicating the memory area to the application 600.

When the memory is reserved, the accelerator processor 21 executes accelerator operation processing using the above reserved area of the accelerator memory 22 (S612). When the accelerator operation processing ends, the host processor 10 outputs an accelerator memory-freeing request to free the area in the accelerator memory 22 used for the accelerator operation processing. The host processor 10 performs the accelerator memory freeing processing in response to the request with the OS (S613). The OS in the accelerator 110 frees the area of the accelerator memory 22 designated by the accelerator memory-freeing request. The application 600 includes a series of processing including reserving memory, performing operation, and freeing the memory and one or a plurality of offload processing S610.

The information processing device 100 of the information processing system 150 illustrated in FIG. 10 includes the components illustrated in FIG. 4 described in the first exemplary embodiment. Further, the information processing device 100 executes the application 600 illustrated in FIG. 11B.

The memory processing control unit 200 of the information processing device 100, when receiving an accelerator memory-reserving request 620 from the application 600, executes the processing, which is executed in the main memory 11 as described in the first exemplary embodiment with reference to FIG. 5, in the accelerator memory 22 of the accelerator 110.

Further, the memory processing control unit 200, when receiving an accelerator memory-freeing request 630 from the application 600, executes the processing, which is executed in the main memory 11 as described in the first exemplary embodiment with reference to FIG. 6, in the accelerator memory 22 of the accelerator 110.

Further, the reserving request processing unit 250 and freeing request processing unit 260 of the information processing device 100, when receiving an instruction from the memory processing control unit 200, executes the processing, which is executed with the OS 400 as described in the first exemplary embodiment, with the OS in the accelerator 110.

As described above, according to the third exemplary embodiment, the information processing system 150 includes the accelerator 110 in addition to the information processing device 100 that includes the host processor 10 and the main memory 11. The information processing device 100, when receiving an accelerator memory-reserving request 620 or an accelerator memory-freeing request 630 from the application 600, executes reserving or freeing of the accelerator memory 22 through the OS of the accelerator 110 in the same way as the first exemplary embodiment. According to the third exemplary embodiment, such a configuration enables the host processor 10 to prevent the application 600 from stopping due to an error caused by the shortage of the accelerator memory 22 area even in the information processing system 150 that includes the accelerator 110. Further, the third exemplary embodiment provides an effect of reducing the total time that is taken for accelerator memory reserving processing and accelerator memory freeing processing.

Fourth Exemplary Embodiment

In a fourth exemplary embodiment, a case where the information processing system 150 described in the third exemplary embodiment includes the information processing device 500 illustrated in FIG. 7 in the second exemplary embodiment, as an information processing device, will be described.

The information processing device 500 according to the fourth exemplary embodiment performs the processing described in the second exemplary embodiment with the accelerator 110.

In particular, the memory processing control unit 510 of the information processing device 500, when receiving an accelerator memory-reserving request 620 from the application 600, executes the processing, which is executed in the main memory 11 as described in the second exemplary embodiment with reference to FIG. 8, in the accelerator memory 22 in the accelerator 110.

Further, the memory processing control unit 510, when receiving an accelerator memory-freeing request 630 from the application 600, executes the processing, which is executed in the main memory 11 as described in the second exemplary embodiment with reference to FIG. 9, in the accelerator memory 22 in the accelerator 110.

Further, the reserving request processing unit 250 and freeing request processing unit 520 in the information processing device 500, when receiving an instruction from the memory processing control unit 510, executes the processing, which is executed with the OS 400 as described in the above-described second exemplary embodiment, with the OS of the accelerator 110.

As described above, according to the fourth exemplary embodiment, the information processing device 500 in the information processing system 150 that includes the accelerator 110, when receiving the accelerator memory-reserving request 620 or the accelerator memory-freeing request 630 from the application 600, executes reserving or freeing of the accelerator memory 22 through the OS in the accelerator 110 in the same way as the above-described second exemplary embodiment. According to the fourth exemplary embodiment, such a configuration provides an effect of reducing pending time of the memory-reserving request 310 caused by the shortage of memory even in the information processing system 150 that includes the accelerator 110 in the same way as the effect provided by the second exemplary embodiment.

Fifth Exemplary Embodiment

Figure 12:
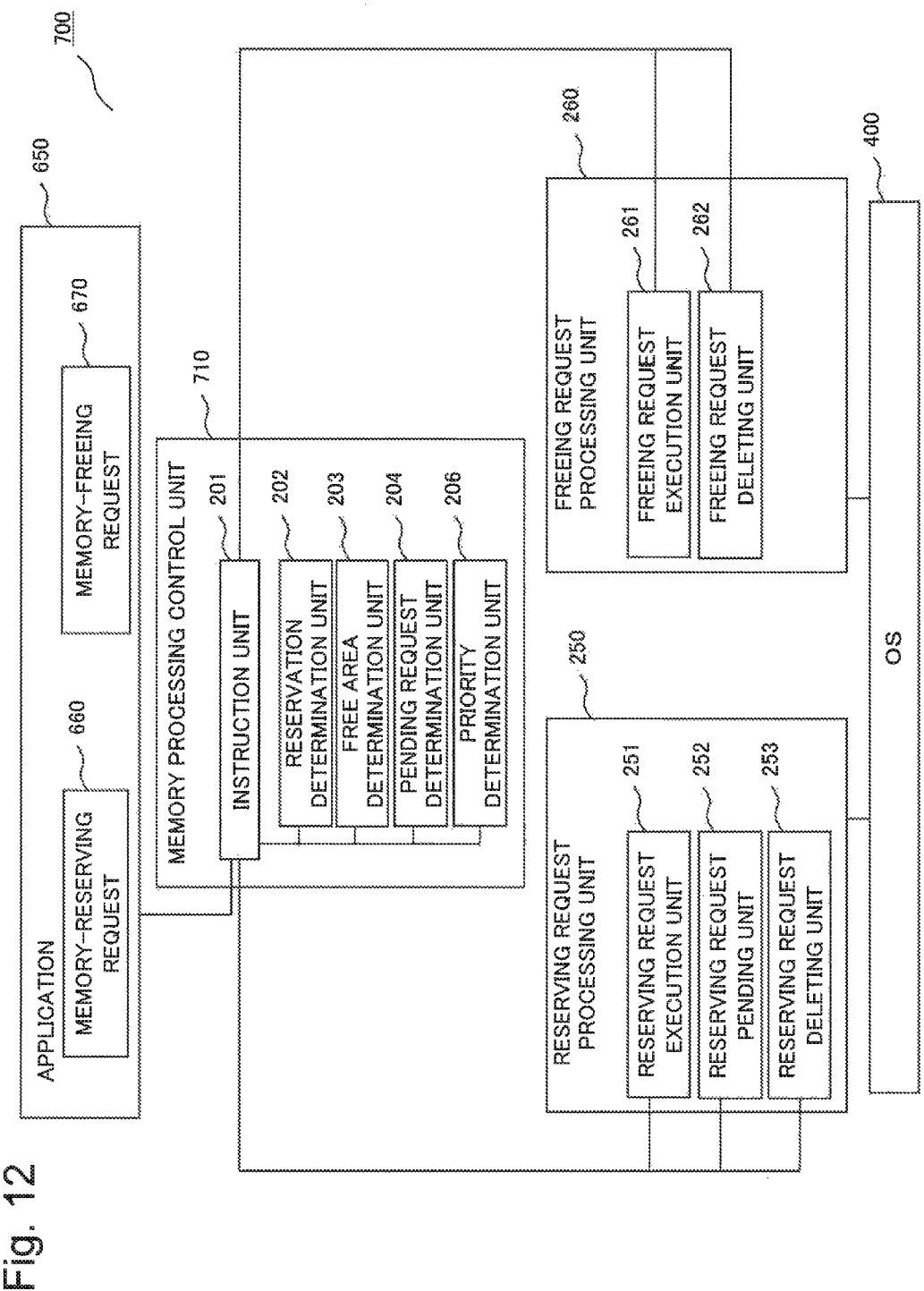
FIG. 12 is a block diagram illustrating components of an information-processing device according to a fifth exemplary embodiment of the present invention.

FIG. 12 is a functional block diagram of an information processing device 700 according to a fifth exemplary embodiment of the present invention. The components illustrated in FIG. 12 include a memory processing control unit 710 instead of the memory processing control unit 200 in the information processing device 100 according to the above-described first exemplary embodiment.

The memory processing control unit 710 includes a priority determination unit 206 in addition to the components of the memory processing control unit 200 as described in the first exemplary embodiment.

Figure 13:
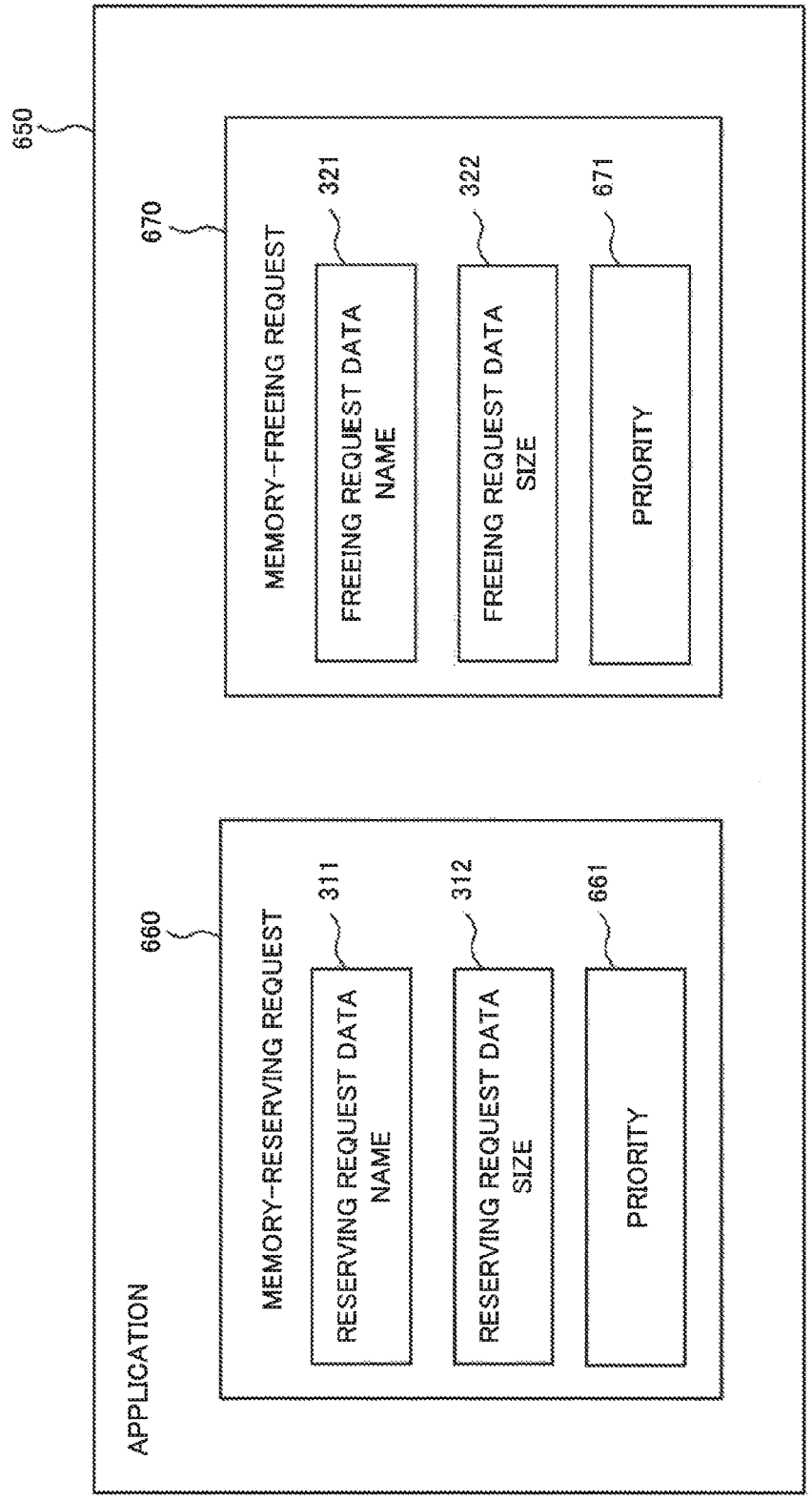
FIG. 13 is a diagram illustrating components of a memory-reserving request and a memory-freeing request included in various applications that are executed in the information-processing device according to the fifth exemplary embodiment of the present invention.

The information processing device 700 executes various applications 650. FIG. 13 is a diagram schematically illustrating functions that are common among the various applications 650 executed in the information processing device 700. As illustrated in FIG. 13, the application 650 includes a memory-reserving request 660 and a memory-freeing request 670. The memory-reserving request 660 includes a reserving request data name 311, a reserving request data size 312, and a priority 661. The memory-freeing request 670 includes a freeing request data name 321, a freeing request data size 322, and a priority 671.

The reserving request data name 311, the reserving request data size 312, the freeing request data name 321, and the freeing request data size 322 are the same as those described in the first exemplary embodiment.

The priority 661 is information indicating the priority of an application 650 that requests the memory-reserving request 660 with reference to the other applications 650. The priority 661 may be a value that indicates a priority order, the degree of priority, or the like.

The priority determination unit 206 in the memory processing control unit 710 determines an application 650 with the highest priority.

Figure 14:
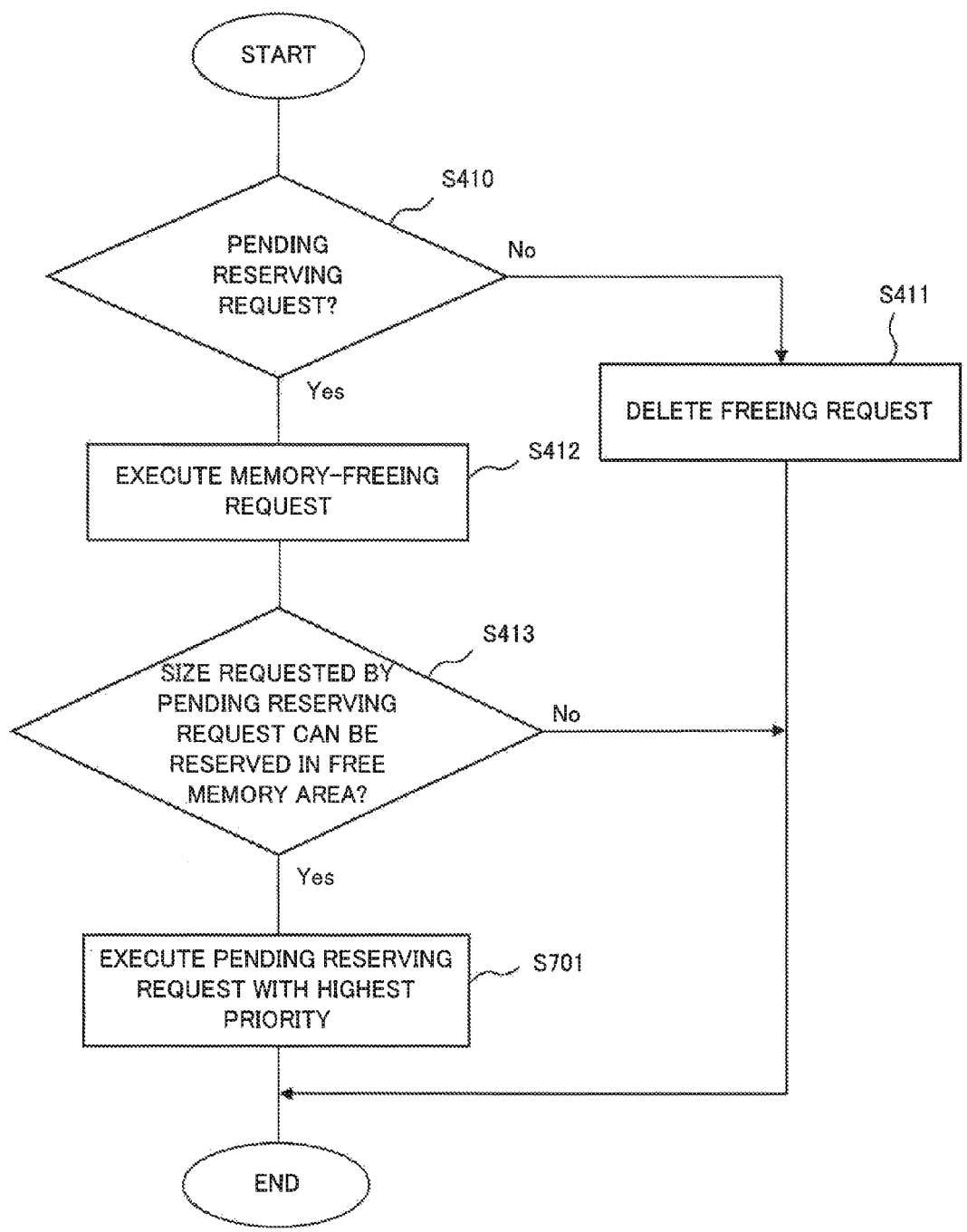
FIG. 14 is a flowchart illustrating processing relating to freeing memory in the information-processing device according to the fifth exemplary embodiment of the present invention.

FIG. 14 is a flowchart illustrating processing relating to freeing memory in the information processing device 700 according to the fifth exemplary embodiment. The processing relating to freeing memory in the information processing device 700 will be described with reference to FIG. 14. It should be noted that, for the processing relating to reserving memory, the processing described in the first exemplary embodiment with reference to FIG. 5 is executed by the memory processing control unit 710 of the information processing device 700.

On receiving the memory-freeing request 670, the memory processing control unit 710 performs S410 to S413 illustrated in FIG. 14 in the same way as the above processing of S410 to S413 illustrated in FIG. 6. If the memory processing control unit 710 determines that a requested memory area can be reserved at S413, the memory processing control unit 710 instructs the priority determination unit 206 to determine the priority of the application if there are a plurality of the memory-reserving requests 660 that are left pending.

In accordance with the instruction, the priority determination unit 206 compares priorities 661 each included in the memory-reserving requests 660 that are left pending, determines the memory-reserving request 660 with the highest priority, as well as, returns the determination result to the instruction unit 201.

The instruction unit 201 instructs the reserving request processing unit 250 to execute the memory-reserving request 660 that is determined as having the highest priority. In accordance with the instruction, the reserving request processing unit 250 executes the memory-reserving request 660 with the highest priority (S701).

As described above, according to the fifth exemplary embodiment, the plurality of applications 650 include individual priorities 661 and 671, and the memory processing control unit 710 in the information processing device 700 includes the priority determination unit 206. The priority determination unit 206 determines the memory-reserving request 660 with the highest priority 661 from among the memory-reserving requests 660 that are left pending, and the reserving request processing unit 250 preferentially executes the memory-reserving request 660. According to the fifth exemplary embodiment, such a configuration provides an effect of preferentially reducing the memory reserving processing and the memory freeing processing that are requested from an application 650 with a high priority by preferentially executing the memory-reserving request 660 from the application 650 with a high priority.

Sixth Exemplary Embodiment

Figure 15:
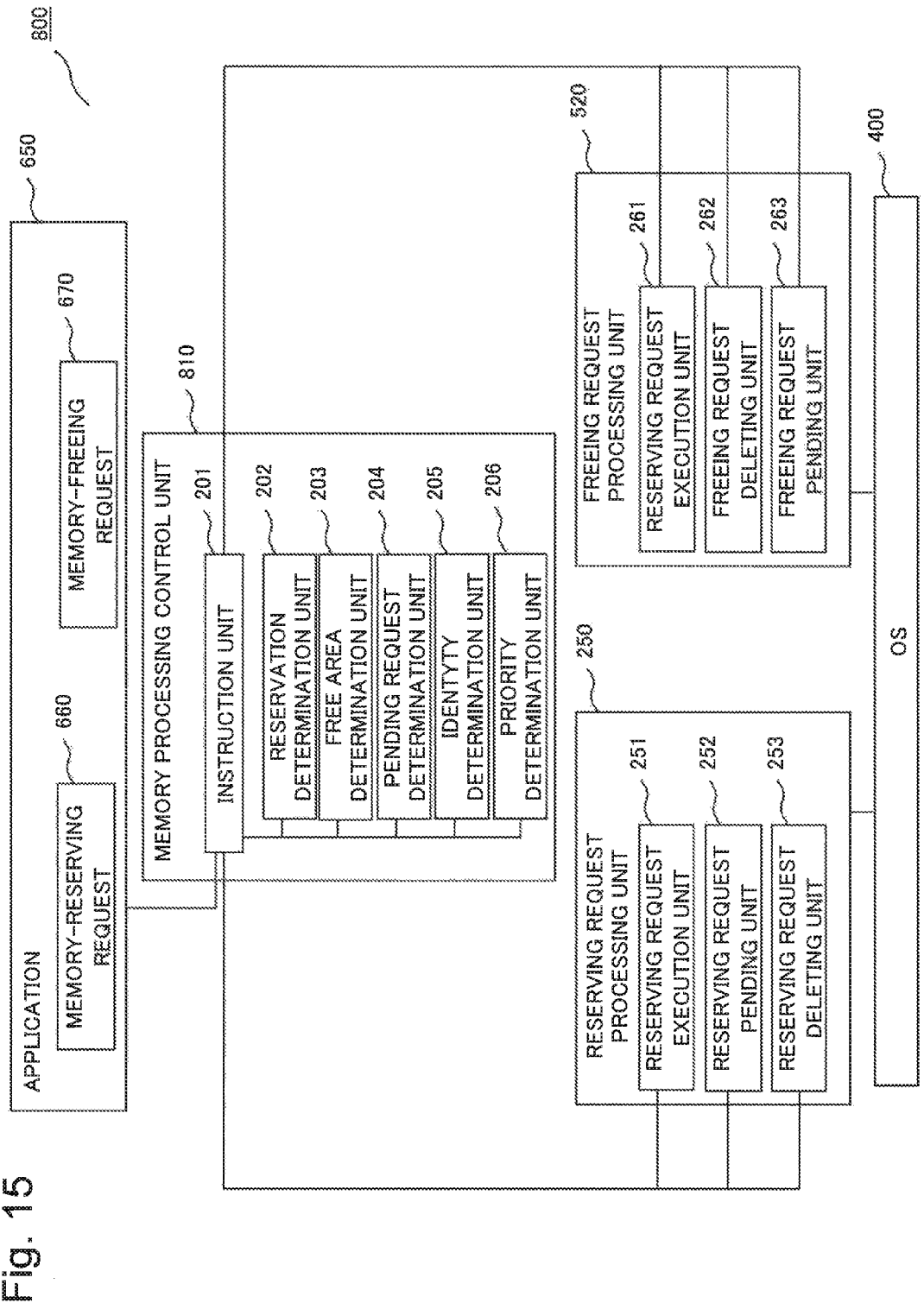
FIG. 15 is a block diagram illustrating components of an information-processing device according to a sixth exemplary embodiment of the present invention.

FIG. 15 is a functional block diagram of an information processing device 800 according to a sixth exemplary embodiment of the present invention. The components illustrated in FIG. 15 include a memory processing control unit 810 instead of the memory processing control unit 510 of the information processing device 500 according to the above-described second exemplary embodiment.

The memory processing control unit 810 includes a priority determination unit 206 in addition to the components of the memory processing control unit 510 as described in the second exemplary embodiment.

The information processing device 800 executes the application 650 as described in the fifth exemplary embodiment with reference to FIG. 13. The priority determination unit 206 determines an application 650 with the highest priority on the basis of the priorities 661 and 671 included in the applications 650.

Figure 16:
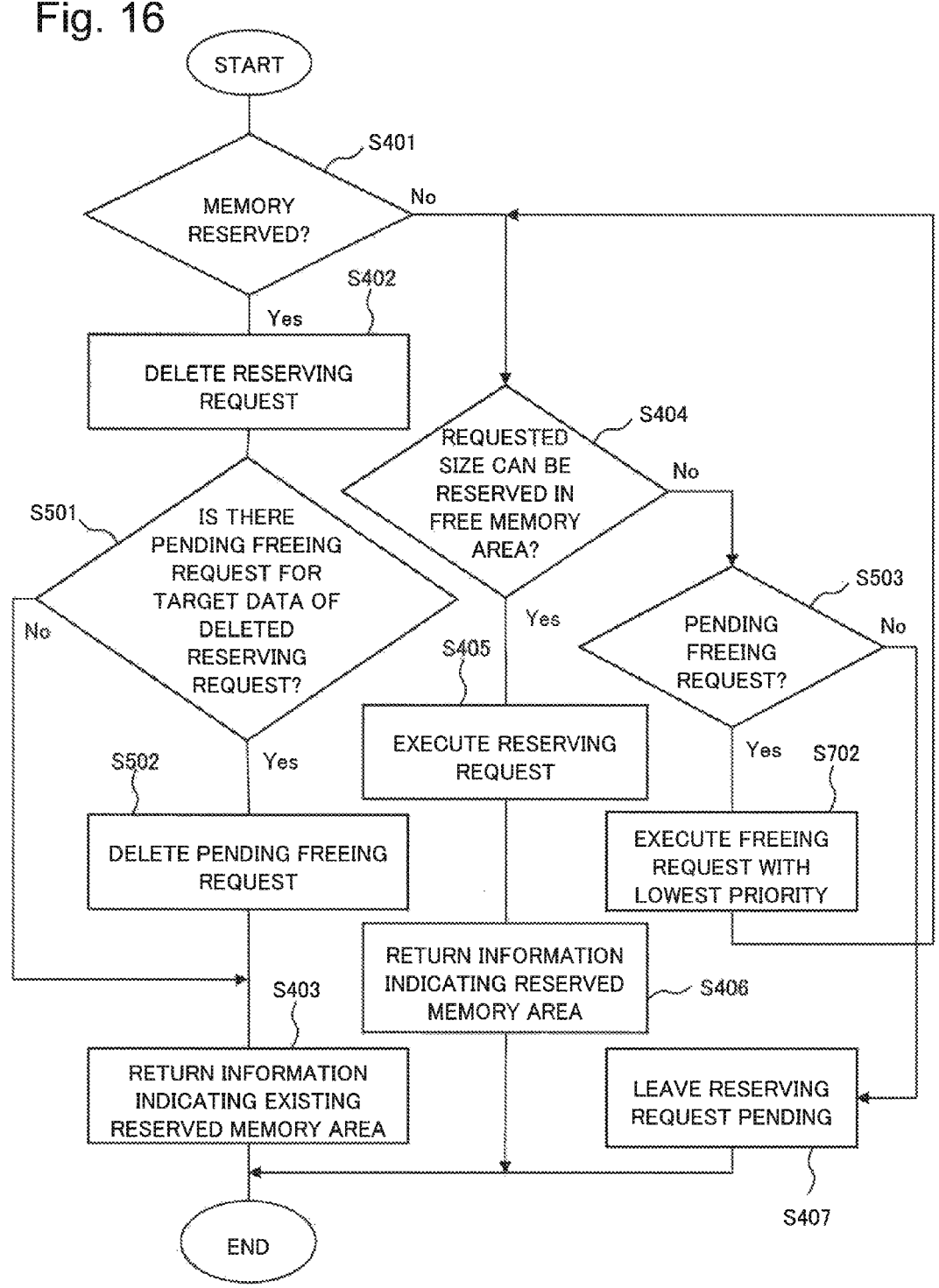
FIG. 16 is a flowchart illustrating processing relating to reserving memory in the information-processing device according to the sixth exemplary embodiment of the present invention.

FIG. 16 is a flowchart illustrating processing relating to reserving memory in the information processing device 800 according to the sixth exemplary embodiment. The processing relating to reserving memory in the information processing device 800 will be described with reference to FIG. 16.

When receiving the memory-reserving request 660, the memory processing control unit 810 processes S401 to S407 and S501 to S503 illustrated in FIG. 16 in the same way as the processing of S401 to S407 and S501 to S503 illustrated in FIG. 8 as described in the second exemplary embodiment. The memory processing control unit 810 instructs the priority determination unit 206 to determine the priority of the application if there are a plurality of the memory-freeing requests 670 that are left pending at S503.

In accordance with the instruction, the priority determination unit 206 compares priorities 671 each included in the memory-freeing requests 670 that are left pending, determines the memory-freeing request 670 with the lowest priority, as well as, returns determination result to the instruction unit 201.

The instruction unit 201 instructs the freeing request processing unit 520 to execute the memory-freeing request 670 that is determined as having the lowest priority. In accordance with the above instruction, the freeing request processing unit 520 executes the memory-freeing request 670 with the lowest priority (S702).

It should be noted that, when receiving the memory-freeing request 670, the memory processing control unit 810 in the information processing device 800 performs the processing described in the second exemplary embodiment with reference to FIG. 9.

As described above, according to the sixth exemplary embodiment, the plurality of applications 650 include individual priorities 661 and 671, and the memory processing control unit 810 in the information processing device 800 includes the priority determination unit 206. The priority determination unit 206 determines the memory-freeing request 670 with the lowest priority 671 from among the memory-freeing requests 670 that are left pending, and the freeing request processing unit 520 preferentially performs the memory-freeing request 670. According to the sixth exemplary embodiment, such a configuration provides an effect of preferentially reducing the memory reserving processing and the memory freeing processing that are requested from an application 650 with a high priority by preferentially executing the memory-freeing request 670 from the application 650 with a low priority. Further, the sixth exemplary embodiment provides an effect of reducing pending time of the memory-reserving request 660 caused by the shortage of memory, since the pending memory-freeing request 670 is executed when the requested size cannot be reserved in the free area.

Seventh Exemplary Embodiment

Figure 17:
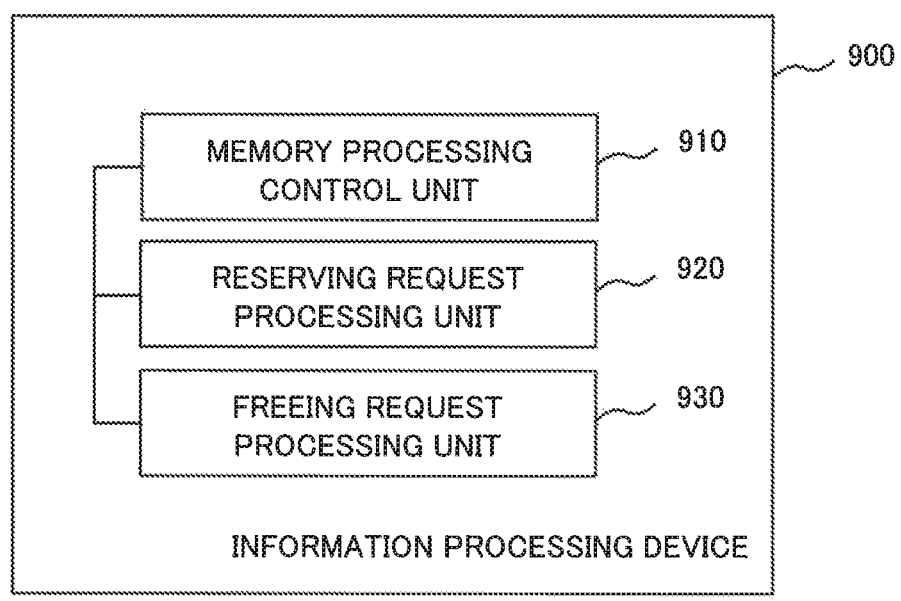
FIG. 17 is a block diagram illustrating components of an information-processing device according to a seventh exemplary embodiment of the present invention.

FIG. 17 is a functional block diagram of an information processing device 900 according to a seventh exemplary embodiment of the present invention. As illustrated in FIG. 17, the information processing device 900 includes a memory processing control unit 910, a reserving request processing unit 920, and a freeing request processing unit 930.

The memory processing control unit 910, when receiving a memory-reserving request for a memory to be used in operation processing written in an application, determines whether an area size requested by the memory-reserving request can be reserved in a free area of the memory, and, when receiving a memory-freeing request for the memory used in the operation processing written in the application, determines whether there is the memory-reserving request that is left pending.

The reserving request processing unit 920 leaves the memory-reserving request pending when the memory processing control unit 910 determines that the area size cannot be reserved. The freeing request processing unit 930 deletes or leaves pending the memory-freeing request when the memory processing control unit 910 determines that there is no memory-reserving request that is left pending.

According to the seventh exemplary embodiment, employing the above configuration provides an effect of improving throughput by preventing applications from stopping due to the shortage of a memory area, as well as, reducing application processing time required for reserving and freeing the memory.

In the above-described exemplary embodiments, the functions indicated by blocks in the information processing device illustrated in FIG. 4 and the like are implemented, as an example, by a software program executed by the host processor 10 illustrated in FIG. 1. However, a part or whole of the functions indicated by the blocks in the information processing device illustrated in FIG. 4 and the like may otherwise be implemented as hardware.

Further, the present invention as described in the exemplary embodiments is achieved by an information processing device that is supplied with a computer program that can implement the above-described functions, in which the host processor 10 loads the computer program onto the main memory 11 and executes the program.

The supplied computer program may be stored in readable/writable memory (temporary storage medium) or a computer-readable storage device, like a hard disc device. In such case, it is understood that the invention is configured by codes representing the computer program or a storage medium storing the computer program.

Although the invention is described by referring to the exemplary embodiments, the invention is not limited to the above mentioned exemplary embodiments. It is to be understood that to the configurations and details of the invention, various changes can be made within the scope of the invention.

This application is based upon and claims the benefit of priority from Japanese Patent Application No. 2014-109684 filed on May 28, 2014, the entire disclosure of which is incorporated herein.

INDUSTRIAL APPLICABILITY

The present invention can be applied, for example, to a memory management scheduler, in an information processing system that includes a host processor and an accelerator, which executes a multi-task job by offloading a part of processing included in an application to the accelerator. Further, the present invention can also be applied to a job dispatcher in an information processing system that includes a plurality of information processing devices.

REFERENCE SIGNS LIST 10 host processor
11 main memory
12 ROM or recording medium
100,500,700,800 information-processing device
200 memory processing control unit
201 instruction unit
202 reservation determination unit
203 free area determination unit
204 pending request determination unit
205 identity determination unit
206 priority determination unit
250 reserving request processing unit
251 reserving request execution unit
252 reserving request pending unit
253 reserving request deleting unit
260 freeing request processing unit
261 freeing request execution unit
262 freeing request deleting unit
263 freeing request pending unit
300 application
400 OS

What is claimed is:

1. An information processing device comprising:
one or more processors acting as memory processing control unit configured to, when receiving a memory-reserving request for a memory to be used in operation processing written in an application, determine whether an area size requested by the memory-reserving request can be reserved in a free area of the memory, and, when receiving a memory-freeing request for the memory used in the operation processing written in the application, determines whether there is the memory-reserving request that is left pending;
the one or more processors acting as reserving request processing unit configured to leave the memory-reserving request pending when the memory processing control unit determines that the area size cannot be reserved; and
the one or more processors acting as freeing request processing unit configured to delete or leave pending the memory-freeing request when the memory processing control unit determines that there is no memory-reserving request that is left pending.

2. The information processing device according to claim 1,
wherein the memory processing control unit, when receiving the memory-reserving request, determines whether the memory is reserved for information which requests memory reserving by the memory-reserving request; and
the reserving request processing unit deletes the memory-reserving request if the memory processing control unit determines that the memory is reserved.

3. The information processing device according to claim 1, wherein, if the memory processing control unit determines that there is the memory-reserving request that is left pending as the result of determining whether there is the memory-reserving request that is left pending in response to the memory-freeing request, the freeing request processing unit executes a freeing processing in accordance with the memory-freeing request and the reserving request processing unit executes reserving processing in accordance with the memory-reserving request that is left pending.

4. The information processing device according to claim 3,
wherein the reserving request processing unit, in execution of reserving processing in accordance with the memory-reserving request that is left pending, executes reserving processing in accordance with a memory-reserving request that has a highest priority in the memory-reserving requests.

5. The information processing device according to claim 1,
wherein, if the memory processing control unit determines that there is no memory-reserving request that is left pending as the result of determining whether there is the memory-reserving request that is left pending in response to the memory-freeing request, the freeing request processing unit leaves pending the memory-freeing request, and
if the memory processing control unit determines that an area size requested by the memory-reserving request cannot be reserved in a free area of the memory as the result of determining whether the area size can be reserved in response to the memory-reserving request, the freeing request processing unit executes a freeing processing in accordance with the memory-freeing request that is left pending.

6. The information processing device according to claim 5,
wherein, in response to the memory-reserving request, the memory processing control unit determines whether the memory is reserved for information which requests memory reserving by the memory-reserving request; and
if the memory processing control unit determines that the memory is reserved, the reserving request processing unit deletes the memory-reserving request, and
the freeing request processing unit deletes the memory-freeing request that is left pending, the memory-freeing request being from the information which requests the memory-reserving request by the reserving request deleted by the reserving request processing unit.

7. The information processing device according to claim 5,
wherein, in response to the memory-reserving request, if the memory processing control unit determines that the area size requested by the memory-reserving request cannot be reserved in the free area of the memory as the result of determining whether the area size can be reserved, the freeing request processing unit executes the freeing processing in accordance with a memory-freeing request with a lowest priority in the memory-freeing requests that are left pending.

8. An information processing system comprising:
the information processing device according to claim 1; and
an accelerator that is connected to the information processing device via a communication channel and comprises a second memory used for operation processing written in the application,
wherein the memory processing control unit included in the information processing device, in response to a second memory-reserving request for the second memory to be used for the operation processing written in the application, determines whether an area size that is requested by the second memory-reserving request can be reserved in a free area of the second memory and, in response to a second memory-freeing request for the second memory used for the operation processing written in the application, determines whether there is the second memory-reserving request that is left pending;

if the memory processing control unit determines that the area size cannot be reserved, the freeing request processing unit included in the information processing device leaves pending the second memory-reserving request; and if the memory processing control unit determines that there is no second memory-reserving request that is left pending, the freeing request processing unit included in the information processing device deletes or leaves pending the second memory-freeing request.

9. A memory management method comprising:

when receiving a memory-reserving request for a memory to be used in operation processing written in an application, determining whether an area size requested by the memory-reserving request can be reserved in a free area of the memory, and, when receiving a memory-freeing request for the memory used in the operation processing written in the application, determines whether there is the memory-reserving request that is left pending;

leaving the memory-reserving request pending when determined that the area size cannot be reserved; and deleting or leaving pending the memory-freeing request when determined that there is no memory-reserving request that is left pending.

10. A non-transitory program storage medium storing a memory management program that causes a computer to execute:

when receiving a memory-reserving request for a memory to be used in operation processing written in an application, a process that determines whether an area size requested by the memory-reserving request can be reserved in a free area of the memory, and, when receiving a memory-freeing request for the memory used in the operation processing written in the application, determines whether there is the memory-reserving request that is left pending;

a process that leaves the memory-reserving request pending when determined that the area size cannot be reserved; and a process that deletes or leaves pending the memory-freeing request when determined that there is no memory-reserving request that is left pending.

* * * * *